United States Patent
Horn et al.

(10) Patent No.: US 8,599,701 B2
(45) Date of Patent: Dec. 3, 2013

(54) SYSTEMS, METHODS AND DEVICES TO ENABLE MANAGEMENT OF WIRELESS NETWORK RESOURCES

(75) Inventors: Gavin Horn, La Jolla, CA (US); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 12/761,209

(22) Filed: Apr. 15, 2010

(65) Prior Publication Data

US 2010/0265827 A1    Oct. 21, 2010

Related U.S. Application Data

(63) Continuation of application No. 12/607,899, filed on Oct. 28, 2009.

(60) Provisional application No. 61/169,989, filed on Apr. 16, 2009.

(51) Int. Cl.
*G01R 31/08* (2006.01)

(52) U.S. Cl.
USPC .......................................................... 370/241

(58) Field of Classification Search
None
See application file for complete search history.

(56) References Cited

U.S. PATENT DOCUMENTS

| | | |
|---|---|---|
| 6,657,538 B1 | 12/2003 | Ritter |
| 2007/0232325 A1 | 10/2007 | Oshime et al. |
| 2007/0297524 A1 | 12/2007 | Jones et al. |
| 2008/0214220 A1 | 9/2008 | Beziot et al. |
| 2008/0267153 A1 | 10/2008 | Mukherjee et al. |
| 2009/0070694 A1 | 3/2009 | Ore et al. |

(Continued)

FOREIGN PATENT DOCUMENTS

| | | |
|---|---|---|
| CN | 101187294 A | 5/2008 |
| CN | 101287294 A | 10/2008 |

(Continued)

OTHER PUBLICATIONS

3rd Generation Partnership Project: "Technical Specification Group Core Network and Terminals; Non-Access-Stratum (NAS) protocol for Evolved Packet System (EPS); Stage 3 (Release 8); 3GPP TS 24.301 v I . I . I" Oct. 28, 2008, pp. 1-177, XP002566004 Retrieved from the Internet: URL:www.3gpp.org> [retrieved on Jan. 28, 2010] Chapters 4.4.3.3,5.2.3.2.3,5.5.1.1,5.5.1.2.4-5,5.5. 3.2.4; p. 16.

(Continued)

*Primary Examiner* — Chi Pham
*Assistant Examiner* — Kouroush Mohebbi
(74) *Attorney, Agent, or Firm* — François A. Pelaez

(57) ABSTRACT

The present disclosure provides systems, methods and devices for selectively adjusting a quality of service QoS of communication between a wireless access point and a UE based on both a value indicative of system resources and closed subscriber group (CSG) subscription data, such that a member has priority access to system resources over a non-member. The systems, methods and devices described herein allow an access point operating in a hybrid mode to discriminate between CSG members and non-members, without having to terminate communication links in order to provide CSG members with particular QoS levels. In some embodiments, non-members can maintain or establish new communication links with lower QoS levels in order to utilize unused and available capacity, thereby increasing the utilization of system resources available through femto nodes operating in a hybrid mode.

46 Claims, 16 Drawing Sheets

(56) References Cited

U.S. PATENT DOCUMENTS

| | | | |
|---|---|---|---|
| 2009/0093232 | A1 | 4/2009 | Gupta et al. |
| 2010/0075670 | A1 | 3/2010 | Wu |
| 2010/0110945 | A1 | 5/2010 | Koskela et al. |
| 2010/0112980 | A1 | 5/2010 | Horn et al. |
| 2010/0227611 | A1* | 9/2010 | Schmidt et al. ............... 455/434 |
| 2011/0269460 | A1 | 11/2011 | Dalsgaard et al. |

FOREIGN PATENT DOCUMENTS

| | | |
|---|---|---|
| JP | 2010525752 A | 7/2010 |
| JP | 2011501917 | 1/2011 |
| RU | 2216114 C2 | 11/2003 |
| WO | WO2006037361 | 4/2006 |
| WO | WO 2006037361 A1 * | 4/2006 |
| WO | WO2009034076 A2 | 3/2009 |

OTHER PUBLICATIONS

3rd Generation Partnership Project;Technical Specification Group Services andSystem Aspects; Architecture aspects of Home NodeB and Home eNodeB (Release 9) 3GPP Standard; 3GPP TR 23.830, SRD Generation Partnership Project (3GPP), Mobile Competence Centre.

Ericsson: "QoS principles in Hybrid 3,23 access cell" 3GPP Draft; R3-090832, SRD Generation Partnership Project (3GPP), Mobile Competence Centre; 650, Route Des Lucioles; F-06921 Sophia-Antipolis Cedex; France, No. Seoul, Korea; Mar. 18, 2009.

Huawei: "A method of white I i st management" 3GPP Draft; CI-083297, 3rd Generation Partnership Project (3GPP), Mobile Competence Centre; 650, Route Des Lucioles; F-06921 Sophia-Antipolis Cedex; France, No. Budapest, Hungary; Aug. 11, 2008, XP050308514 [retrieved on Aug. 11, 2008] chapter 10.12.4.x.

NTT Docomo et al: "CSG with limited open access" 3GPP Draft; R2-075150 CSG With Limited Open Access, 3rd Generation Partnership Project (3GPP), Mobile Competence Centre; 650, Route Des Lucioles; F-06921 Sophia-Antipolis Cedex; France, vol. RAN WG2, No. Jeju; Nov. 12, 2007, XP050137597 [retrieved on Nov. 12, 2007].

Panasonic et al: "Support for Manual CSG w h i t e l i s t update" 3GPP Draft; R2-086191, 3rd Generation Partnership Project (3GPP), Mobile Competence Centre; 650, Route Des Lucioles; F-06921 Sophia-Antipolis Cedex; France, No. Prague, Czech Republic; Nov. 4, 2008, XP050321226 [retrieved on Nov. 4, 2008].

Qualcomm Europe: "Update of allowed CSG list after successful manual selection of a CSG cell in a different PLMN" 3GPP Draft; CI-093863 Rev of CI-093534 CSG 24.301, 3rd Generation Partnership Project (3GPP), Mobile Competence Centre; 650, Route Des Lucioles; F-06921 Sophia-Antipolis Cedex; France, No. Sevilla; Aug. 24, 2009, XP050382752 [retrieved on Aug. 31, 2009] Title, Reasons for change, chapter 5.5.1.2.4.

Qualcomm Europe: "Update of allowed CSG list after successful manual selection of a CSG cell in a different PLMN" 3GPP Draft; CI-093864-Rev-0f_CI-093536-24008-Manual-CS G-Selection, 3rd Generation Partnership Project (3GPP), Mobile Competence Centre; 650, Route Des Lucioles; F-06921 Sophia-Antipolis Cedex; France, No. Sevilla; Aug. 24, 2009, XP050382753 [retrieved on Aug. 31, 2009] Title, Reason for change, Summary of change, Consequences if not approved, Chapters 4.4.4.6, 4.7.5.1.3 and last paragraph of Chapter 4.7.3.1.3.

Qualcomm Europe: "UTRA HNB Idle Mode (Re)selection and UE Access Control" 3GPP Draft; R2-083392, 3rd Generation Partnership Project (3GPP), Mobile Competence Centre; 650, Route Des Lucioles; F-06921 Sophia-Antipolis Cedex; France, vol. RAN WG2, No. Warsaw, Poland; Jun. 24, 2008, XP050140786 [retrieved on Jun. 24, 2008].

Telecom Italia et al: "EMM reject cause for CSG and Allowed CSG l i s t update procedures" 36PP Draft; CI-084475, 3rd Generation Partnership Project (3GPP), Mobile Competence Centre; 650, Route Des Lucioles; F-06921 Sophia-Antipolis Cedex; France, No. Phoenix; Oct. 13, 2008, XP050309525 [retrieved on Oct. 13, 2008] Reason for change, chapters 3.1, 5.5.1.2.4-5.

T-Mobile: "Update of CSG list in manual mode" 3GPP Draft; CI-090867, 3rd Generation Partnership Project (3GPP), Mobile Competence Centre; 650, Route Des Lucioles; F-06921 Sophia-Antipolis Cedex; France, No. San Antonio; Feb. 24, 2009, XP050311240 [retrieved on Feb. 24, 2009] Title, Reason for Change, chapter 4.4.4.6.

Vodafone: "Requirements for Hybrid Access 5,25,36, Mode and RAN2 Impacts" 46 3GPP Draft; R2-092122, SRD Generation Partnership Project (3GPP), Mobile Competence Centre; 650, Route Des Lucioles; F-06921 Sophia-Antipolis Cedex; France, No. Seoul, Korea.

3GPP Draft; R2-092122, SRD Generation Partnership Project (3GPP), Mobile Competence Centre; 650, Route Des Loucioles; F-06921 Sophia-Antipolis Cedex; France, No. Seoul, Korea.

T-Mobile: "Update of CSG list in manual mode" 3GPP Draft; CI-091257, 3rd Generation Partnership Project (3GPP), Mobile Competence Centre; 650, Route Des Lucioles; F-06921 Sophia-Antipolis Cedex; France, No. San Antonio; Feb. 24, 2009, XP050311535 [retrieved on Feb. 24, 2009] Title, Reason for change, chapter 4.4.4.6.

3GPP: "Technical Specification Group Core Network and Terminals; 3GPP System Architecture Evolution; CT WG1 Aspects (Release 8) TR 24.801 v8.0.1" Oct. 14, 2008, pp. 1-213, XP002566005 Retrieved from the Internet: URL:www.3gpp.org> [retrieved on Jan. 28, 2010] Chapters 10.12.4 and 10.12.4.4.

3rd Generation Partnership Project: "Technical Specification Group Core Network and Terminals; Non-Access-Stratum (NAS) protocol for Evolved Packet System (EPS); Stage 3 (Release 8); 3GPP TS 24.301 v I.I.I" Oct. 28, 2008, pp. 1-177, XP002566004 Retrieved from the Internet: URL:www.3gpp.org> [retrieved on Jan. 28, 2010] Chapters 4.4.3.3,5.2.3.2.3,5.5.1.1,5.5.1.2.4-5,5.5. 3.2.4; p. 16.

3rd Generation Partnership Project;Technical Specification Group Services and System Aspects; Architecture aspects of Home Node B and Home eNode B (Release 9) 3GPP Standard; 3GPP TR 23.830, SRD Generation Partnership Project (3GPP), Mobile Competence Centre.

Ericsson: "QoS principles in Hybrid 3,23 access cell" 3GPP Draft; R3-090832, SRD Generation Partnership Project (3GPP), Mobile Competence Centre; 650, Route Des Lucioles; F-06921 Sophia-Antipolis Cedex; France, No. Seoul, Korea, Mar. 18, 2009.

Huawei: "A method of white I i st management" 3GPP Draft; CI-083297, 3RD Generation Partnership Project (3GPP), Mobile Competence Centre; 650, Route Des Lucioles; F-06921 Sophia-Antipolis Cedex; France, No. Budapest, Hungary, Aug. 11, 2008, XP050308514 [retrieved on Aug. 11, 2008] chapter 10.12.4.x.

International Search Report and the Written Opinion—PCT/US2009/062876, International Search Authority—European Patent Office—Feb. 15, 2010.

International Search Report and Written Opinion—PCT/US2010/031482, International Search Authority—European Patent Office—Aug. 30, 2010.

NTT Docomo et al: "CSG with limited open 1-48 access" 3GPP Draft; R2-075150 CSG with Limited Open Access, SRD Generation Partnership Project (3GPP), Mobile Competence Centre; 650, Route Des Lucioles; F-06921 Sophia-Antipolis Cedex; France, vol. Ran WG2.

NTT Docomo et al: "CSG with limited open access" 3GPP Draft; R2-075150 CSG with Limited Open Access, 3RD Generation Partnership Project (3GPP), Mobile Competence Centre; 650, Route Des Lucioles; F-06921 Sophia- Antipolis Cedex; France, vol. RAN WG2, No. Jeju, Nov. 12, 2007, XP050137597 [retrieved on Nov. 12, 2007] the whole document.

Panasonic et al: "Support for Manual CSG whitelist update" 3GPP Draft; R2086191, 3RD Generation Partnership Project (3GPP), Mobile Competence Centre; 650, Route Des Lucioles; F-06921 Sophia-Antipolis Cedex; France, No. Prague, Czech Republic, Nov. 4, 2008, XP050321226 [retrieved on Nov. 4, 2008] the whole document.

Qualcomm Europe et al: "QoS principles for CSG members and non-members at Hybrid access mode HeNBs" 3GPP Draft;

(56) References Cited

OTHER PUBLICATIONS

R3-091022, SRD Generation Partnership Project (3GPP), Mobile Competence Centre; 650, Route Des Lucioles; F-06921 Sophia-Antipolis Cedex; Fra.
Qualcomm Europe: "Update of allowed CSG list after successful manual selection of a CSG cell in a different PLMN" 3GPP Draft; CI-093863 Rev of CI-093534 CSG 24.301, 3RD Generation Partnership Project (3GPP), Mobile Competence Centre; 650, Route Des Lucioles; F-06921 Sophia-Antipolis Cedex; France, No. Sevilla, Aug. 24, 2009, XP050382752 [retrieved on Aug. 31, 2009] Title, Reasons for change, chapter 5.5.1.2.4.
Qualcomm Europe: "Update of allowed CSG list after successful manual selection of a CSG cell in a different PLMN" 3GPP Draft; CI-093864-Rev-0f_CI-093536-24008-Manual-CS G-Selection, 3RD Generation Partnership Project (3GPP), Mobile Competence Centre; 650, Route Des Lucioles; F-06921 Sophia-Antipolis Cedex; France, No. Sevilla, Aug. 24, 2009, XP050382753 [retrieved on Aug. 31, 2008] Title, Reason for change, Summary of change, Consequences if not approved, Chapters 4.4.4.6, 4.7.5.1.3 and last paragraph of Chapter 4.7.3.1.3.
Qualcomm Europe: "UTRA HNB Idle Mode (Re)selection and UE Access Control" 3GPP Draft; R2-083392, 3RD Generation Partnership Project (3GPP), Mobile Competence Centre; 650, Route Des Lucioles; F-06921 Sophia-Antipolis Cedex; France, vol. RAN WG2, No. Warsaw, Poland; 20080624, Jun. 24, 2008, XP050140786 [retrieved on Jun. 24, 2008] the whole document.
Telecom Italia et al: "EMM reject cause for CSG and Allowed CSG list update procedures" 36PP Draft; CI-084475, 3RD Generation Partnership Project (3GPP), Mobile Competence Centre; 650, Route Des Lucioles; F-06921 Sophia-Antipolis Cedex; France, No. Phoenix, Oct. 13, 2008, XP050309525 [retrieved on Oct. 13, 2008] Reason for change, chapters 3.1, 5.5.1.2.4-5.
T-Mobile: "Update of CSG list in manual mode" 3GPP Draft; CI-090867, 3RD Generation Partnership Project (3GPP), Mobile Competence Centre; 650, Route Des Lucioles; F-06921 Sophia-Antipolis Cedex; France, No. San Antonio, Feb. 24, 2009, XP050311240 [retrieved on Feb. 24, 2009] Title, Reason for Change, chapter 4.4.4.6.
Vodafone: "Requirements for Hybrid Access 5,25,36, Mode and RAN2 Impacts" 46.
Qualcomm Europe, "Signalling support for open HeNB deployments", 3GPPTSG-RAN WG2 #63, Aug. 8, 2012, http://www.3gpp.org/ftp/tsg_ran/WG2_RL2/WSGR2_63/Docs/R2-083883.zip.

\* cited by examiner

Scenario: CSG member and non-GBR bearer

Scenario: New non-CSG member, GBR bearer

Scenario: New non-CSG member, non-GBR bearer

SYSTEMS, METHODS AND DEVICES TO ENABLE MANAGEMENT OF WIRELESS NETWORK RESOURCES

CLAIM OF PRIORITY UNDER 35 U.S.C. §119

The present Application for Patent claims priority to U.S. Provisional Application No. 61/169,989, entitled "METHOD, APPARATUS, AND SYSTEM TO ENABLE SERVICE AT A HOME BASE STATION FOR CLOSED SUBSCRIBER GROUP MEMBERS AND NON-MEMBERS," filed Apr. 16, 2009. The present Application for Patent also claims priority to U.S. patent application Ser. No. 12/607,899, entitled "SUPPORT FOR MULTIPLE MODES FOR HOME BASE STATIONS," filed Oct. 29, 2009. Both above-referenced applications are hereby expressly incorporated by reference herein.

BACKGROUND

1. Field

The present application relates to wireless networks, and more specifically to systems, methods and devices to enable management of wireless network resources.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In addition to mobile phone networks currently in place, a new class of small base stations has emerged, which may be installed in a private or public space to provide indoor wireless coverage to mobile units using existing broadband Internet connections. These small base stations are generally known as access point base stations, or, alternatively, Home Node B (HeNB or HNB) or femto nodes. Typically, femto nodes are connected to the Internet and the mobile operator's network via a direct subscriber line (DSL) router or a cable modem. Multiple femto nodes may be deployed by individual users in the coverage area of a conventional macro node or cell. A particular femto node or group of femto nodes may only permit access to a particular group of users, known as a closed subscriber group (CSG). Alternatively, other femto nodes, known as open access nodes, allow all users access without discrimination. There are also hybrid-femto nodes that provide access to both CSG members and non-members. However, hybrid-femto nodes discriminate between CSG members and non-members, and will terminate or deny system access to non-members when CSG members are underserviced. In some cases, the discrimination between non-CSG members and CSG members leaves available system resources underutilized. Increasing the utilization of system resources available through femto nodes is desirable in some instances.

SUMMARY

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used to manage wireless network resources at base stations and/or femto nodes.

One aspect of the disclosure is a method of managing communication at a wireless access point, including: receiving a request from a first access terminal for access to system resources provided from the wireless access point; determining whether the first access terminal is a member of a group or a non-member; and determining a level of service from one of a plurality of levels of service for the first access terminal based on whether the first access terminal is a member or a non-member, wherein the respective levels of service for members and non-members are different. In one embodiment, the method also includes allocating a smaller portion of system resources to the first access terminal than a disparate portion of system resources allocated to one or more other access terminals included in the group. In one embodiment, the method also includes selectively adjusting a quality of service (QoS) of communication between the wireless access point and a second access terminal based on both the value indicative of system resources and whether at least one of the first and second access terminals is a member of a group, wherein a member has priority access to system resources over a non-member.

One aspect of the disclosure is a wireless access point including: a receiver configured to receive a request from a first access terminal for access to system resources provided from the wireless access point; a transmitter configured to provide a forward channel between the wireless access point and one or more access terminals, wherein the forward channel comprises at least a portion of the system resources; a controller configured to execute code; and non-transitory computer readable memory storing code that when executed by the controller is configured to determine whether the first access terminal is a member of a group or a non-member, and determine a level of service from one of a plurality of levels of service for the first access terminal based on whether the first access terminal is a member or a non-member, wherein the respective levels of service for members and non-members is different.

In one embodiment, the receiver is further configured to enable reverse channel communication between the wireless access point and one or more access terminals, and wherein the reverse channel comprises at least a portion of the system resources.

In one embodiment, non-transitory computer readable memory further storing code that when executed by the controller is configured to allocate a smaller portion of system resources to the first access terminal than a disparate portion of system resources allocated to one or more other access terminals included in the group. In one embodiment, non-transitory computer readable memory further storing code that when executed by the controller is configured to selectively adjust a quality of service (QoS) of communication between the wireless access point and a second access terminal based on both the value indicative of system resources and whether at least one of the first and second access terminals is a member of a group, wherein a member has priority access to system resources over a non-member.

One aspect of the disclosure is a machine readable medium having machine executable instructions stored thereon, that when executed by a computing device are configured to: determine whether a first access terminal is a member of a group or a non-member; and determine a level of service from one of a plurality of levels of service for the first access terminal based on whether the first access terminal is a member or a non-member, wherein the respective levels of service for members and non-members is different.

In one embodiment, the machine readable medium further comprises machine executable instructions stored thereon, that when executed by a computing device are configured to selectively adjust a quality of service (QoS) of communication between the wireless access point and a second access terminal based on both the value indicative of system resources and whether at least one of the first and second access terminals is a member of a group, wherein a member has priority access to system resources over a non-member.

One aspect of the disclosure is a wireless access point comprising: means for receiving a request from a first access terminal for access to system resources provided from the wireless access point; means for determining at least one value indicative of system resources provided from the wireless access point; and means for storing code that when executed by a means for executing code is configured to determine a level of service from one of a plurality of levels of service to the first access terminal based on whether the first access terminal is a member or a non-member, wherein the respective levels of service for members and non-members is different.

In one embodiment, the means for storing code is configured to selectively adjust a quality of service (QoS) of communication between the wireless access point and a second access terminal based on both the value indicative of system resources and whether at least one of the first and second access terminals is a member of a group, wherein a member has priority access to system resources over a non-member.

In one embodiment, the wireless access point also includes means for providing a forward channel between the wireless access point and one or more access terminals, wherein the forward channel comprises at least a portion of the system resources.

In one embodiment, the means for receiving is further configured to enable reverse channel communication between the wireless access point and one or more access terminals, and wherein the reverse channel comprises at least a portion of the system resources.

Figure 1:
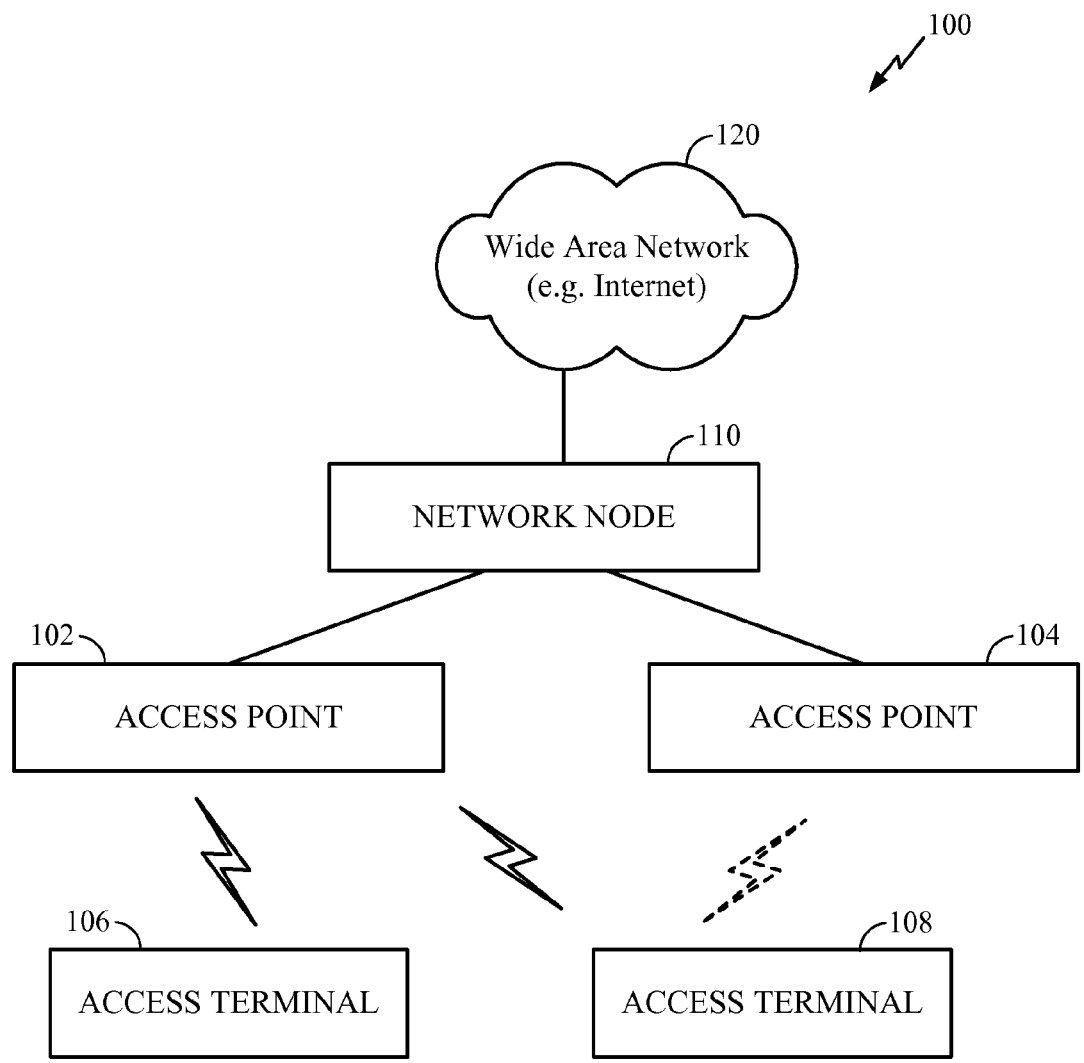
FIG. 1 is a simplified block diagram of several sample aspects of a communication system.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Moreover, the word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). Similarly, cdma2000 is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal (AT) or user equipment (UE) moves through such a network, the access terminal may be served in certain locations by access nodes (ANs) that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB (HNB), Home eNodeB (HeNB), access point base station, femto cell, and so on.

FIG. 1 is a simplified block diagram of several sample aspects of a communication system 100 (e.g., a portion of a communication network). For illustrative purposes only, various aspects of embodiments will be described in the context of one or more network nodes, access points, and access terminals that communicate with one another. It should be appreciated, however, that the description herein may be applicable to other types of apparatus or other similar apparatuses that are referenced using other terminology.

The system 100 includes access points 102, 104, access terminals 106, 108, and a network node 110. Access points 102 and 104 in the system 100 provide one or more services (e.g., network connectivity) for one or more wireless terminals that may be installed within or that may roam throughout an associated geographical area. While only access terminals 106 and 108 are illustrated in FIG. 1, those skilled in the art will appreciate that any number of access terminals or devices considered user equipment may be in communication with access points 102 and 104. In addition, the access points 102 and 104 may communicate with one or more network nodes 110 to facilitate wide area network connectivity through a wide area network 120 (e.g. Internet). Such a network node may take various forms. For example, a network node may comprise a mobility manager or some other suitable network entity (e.g., a core network entity).

The access points 102 and 104 may be restricted in some aspects whereby each provides certain services to certain access terminals (e.g., access terminals 106 and 108) but not to other access terminals (e.g., a macro access terminal, not shown). For example, the access points 102 and 104 may be restricted so as not to provide to other access terminals at least one of: registration, signaling, voice call, data access, or any other cellular service. Closed, open and hybrid access points may be deployed in an ad-hoc manner throughout a wireless network. For example, a given homeowner may install and configure a restricted access point so as to only permit family members access to system resources through the access point and exclude strangers and neighbors. Alternatively, a public-library may install and configure an open access point to provide free access to system resources within the library. Alternatively, a café-owner may install and configure a hybrid access point to provide priority access to system resources for those that purchase items over those that do not purchase items from the café, etc.

The wide area network 120 may comprise any type of electronically connected group of computers and/or devices including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), or Bluetooth (IEEE 802.15.1). Note that computing devices may be desktop, server, portable, hand-held, set-top, or any other desired type of configuration. As used herein, the wide area network 120 includes network variations such as the public Internet, a private network within the Internet, a secure network within the Internet, a private network, a public network, a value-added network, an intranet, and the like. In certain embodiments, wide area network 120 may also comprise a virtual private network (VPN).

Figure 2:
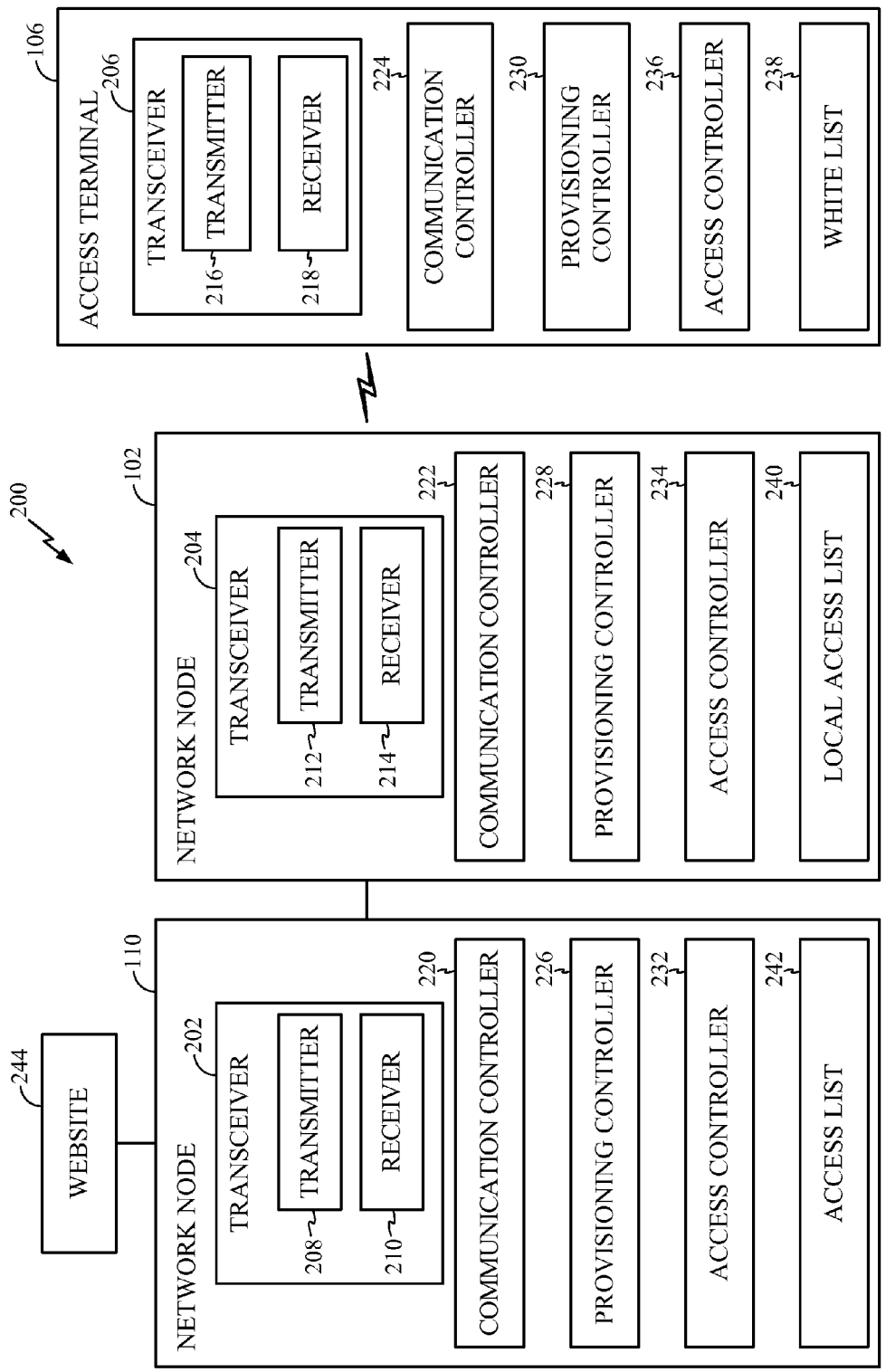
FIG. 2 is a simplified block diagram of several sample network node components.

FIG. 2 is a simplified block diagram showing several sample components that may be incorporated into the network node 110 (e.g., a mobility manager, mobile switching center, or serving GPRS support node), the access point 102, and the access terminal 106. Those skilled in the art will also appreciate from the present disclosure that that the components illustrated for a given one of these nodes also may be incorporated into other nodes in a communication system. For example, the access terminal 108 may include components similar to those described for access terminal 106 and the access point 104 may include components similar to those described for access point 102.

The network node 110, the access point 102, and the access terminal 106 include transceivers 202, 204, and 206, respectively, for communicating with each other and with other nodes. The transceiver 202 includes a transmitter 208 for sending signals (e.g., messages) and a receiver 210 for receiving signals. The transceiver 204 includes a transmitter 212 for transmitting signals and a receiver 214 for receiving signals. The transceiver 206 includes a transmitter 216 for transmitting signals and a receiver 218 for receiving signals.

The network node 110, the access point 102, and the access terminal 106 also include various other components that may be used in conjunction with provisioning nodes and access management as taught herein. For example, the network node 110, the access point 102, and the access terminal 106 may include communication controllers 220, 222, and 224, respectively, for managing communications with other nodes (e.g., sending and receiving messages/indications) and for providing other related functionality as taught herein. The network node 110, the access point 102, and the access terminal 106 may include provisioning controllers 226, 228, and 230, respectively, for provisioning a node and for providing other related functionality as taught herein. The network node 110, the access point 102, and the access terminal 106 may include access controllers 232, 234, and 236, respectively, for providing access management and for providing other related functionality as taught herein. For purposes of illustration, all of the nodes are depicted in FIG. 2 as having functionality relating to provisioning and access control. In some implementations, however, one or more of these components may not be employed at a given node. The discussion that follows describes several different schemes (e.g., in conjunction with different figures) for provisioning network nodes and providing access control. For convenience, in these different schemes, the network node 110, the access point 102, and the access terminal 106 may be referred to as having different functionality and may be referred to as being representative of different types of nodes (e.g., in different implementations the network node 110 may represent an SRNC, or an MME, or a AAA, etc.). It should be appreciated, however, that in a given implementation, the network node 110, the access point 102, and the access terminal 106 may be configured in a specific manner.

Each access terminal (e.g., access terminal 106) in a system may be provisioned to enable communication with one or more access points (e.g., access point 102). In the example of FIG. 2, these operations may be performed, for example, by operation of the provisioning controllers 226 and 230.

In some aspects, an operator may assign a unique identifier to the access terminal 106. In some implementations this identifier comprises a network access identifier (NAI) or mobile station integrated services digital network (MS ISDN) number. Alternatively, the subscriber identity such as International Mobile Subscriber Identity (IMSI) can also be derived from a subscriber identity module such as SIM, USIM, or VSIM present in the access terminal. In some cases this identifier is guaranteed to be unique within an operator domain (e.g., the entire network provided by a cellular operator). In some implementations, such an identifier may be part of the session information for the access terminal 106. For example, the identifier may be sent to the network node 110 (e.g., a session reference network controller, SRNC) by the access terminal 106 when the access terminal 106 creates a session or the identifier may be pushed to the network node 110 from an authentication, authorization, and accounting (AAA) entity once a session is created. In some implementations, the identifier is accessible to a user so that the user may, for example, configure his or her restricted access point(s) to provide service to one or more access terminals. In some implementations an access terminal may be assigned a temporary identifier. For example, the network may assign permanent and temporary identifiers for the access terminal 106 and maintain those identifiers in the network. In addition, the network may send the temporary identifier to the access terminal 106 so that the access terminal 106 may use that identifier when it accesses an access point.

The access terminal 106 also may be provisioned with the identity of each access point (e.g., access point 102) that the access terminal 106 is allowed to access. As described in more detail below, this may involve, for example, sending access point identifiers to the access terminal 106 (e.g., a push model) and/or allowing the access terminal 106 to select the access points to be accessed by the access terminal 106 (e.g., a pull model). The access terminal 106 may thus maintain a list of authorized access points (e.g., a whitelist or preferred user zone list) that the access terminal 106 may reference as it moves through various wireless coverage areas.

In some implementations a user of the access terminal 106 may be prompted to determine whether he or she wishes to enable the access terminal 106 to access to an access point. In some implementations the access terminal 106 may automatically enable access to an access point. In some implementations the access terminal 106 may determine, based on configuration information at the access terminal 106, whether to automatically enable access or require a user prompt to enable access. In some implementations a user may elect to access or elect to not access one or more access terminals. In this case, a list of the allowed and/or rejected access terminal(s) may be maintained at the access terminal 106. In this way, the access terminal 106 may avoid (e.g., automatically prevent) attempting to access an access point on the list.

Each restricted access point (e.g., access point 102) in a system may be provisioned to enable communication with one or more access terminals (e.g., access terminal 106). In the example of FIG. 2, these operations may be performed, for example, by operation of the provisioning controllers 226 and 228.

For example, a unique identifier may be assigned to the access point 102 or to a set of access points (e.g., access points 102 and 104). This unique identifier is different than a unique device identifier that may be assigned to identify individual access terminals in a system. As described in more detail below, such an identifier may comprises, for example, a special type of network identifier (NID) or subnet identifier or an identifier assigned to a group of access terminals that have the same restricted association properties (e.g., a CSG). In some cases, the network may autonomously assign a unique identifier. In some cases, one or more access points may request an identifier (e.g., by determining a proposed identifier and sending it to the network). In these cases, the network may determine whether the requested identifier is already in use by one or more other access points. If the requested identifier is already in use, the network may select another identifier (e.g., a similar identifier) that is not is use by any other access point and send this identifier to the requesting access point(s).

The access point 102 also may be provisioned with one or more identifiers associated with each access terminal (e.g., access terminal 106) that is allowed to access the access point 102. As described in more detail below, this may involve, for example, storing access terminal identifiers in a database managed by a network and/or by storing access terminal identifiers in a local access list at the access point 102.

In some implementations the access control list for a given restricted access point may be managed at that restricted access point. For example, a user may configure his or her access point using an access terminal (e.g., a cell phone) or using a password protected webpage hosted at the restricted access point.

Alternatively, in some implementations an access control list for each restricted access point in a network is managed at the network (e.g., the core network). For example, an access control list may be managed at a web page hosted by the network operator. Managing the access control list at the network may provide one or more advantages in some contexts. In some aspects this approach may allow for more flexibility in policy. For example, the operator may limit access to restricted access points if desired and the operator may check records (e.g., for access terminals) in the same billing plan. In addition, the network may be more reliable than individual access points. Hence, reliability of the access control list may be improved. Also, since the access control list might not be sent to the restricted access point, there may be no need to provide a direct interface to the restricted access points (e.g., application software, USB ports, and so on). Furthermore, through the use of centralized access control lists, it may be easier to manage multiple restricted access points that belong to a common enterprise.

Once a restricted access point is provisioned, it may advertise its assigned identifier over-the-air. For example, the access point 102 may broadcast its identifier as part of its sector parameters, or in some other suitable manner. Moreover, once an access terminal is provisioned, the access terminal may monitor for signals (e.g., pilot/beacon signals) broadcast by nearby access points. As discussed in detail below, if the access terminal 106 identifies signals from the access point 102 (e.g., in a scenario where the access terminal 106 is allowed to access the access point 102), the access terminal 106 may request access to that access point 102. The identification of an accessible access point by the access terminal 106 may involve, for example, comparing an identifier associated with the access point 102 with a trusted list 338 of authorized access points (e.g., the whitelist) maintained by the access terminal 106. In the example of FIG. 2, these and other access-related operations may be performed, for example, by operation of the access controller 236.

The access point 102 and/or one or more network nodes (e.g., the network node 110) may determine whether to allow the access terminal 106 to access the access point 102. This access control operation may involve, for example, confirming the identity of the access terminal 106 and comparing an identifier of the access terminal 106 with a list of authorized access terminals maintained by the access point 102 (e.g., a local access list 240) and/or maintained by the network node 110 (e.g., a network database access list 242). In the example of FIG. 2, these and other access-related operations may be performed, for example, by operation of the access controller 234 and/or the access controller 232.

With the above overview in mind, additional details relating to provisioning and access control will be described with reference to FIGS. 3-8. It should be appreciated based on the teachings herein that one or more of the operations described in conjunction with a given one of these figures may be employed in conjunction with the operations described in another one of these figures. For convenience, these operations will be described with reference to the components of FIG. 3. It should be appreciated that these operations also may be applicable to other nodes in a network.

Figure 3:
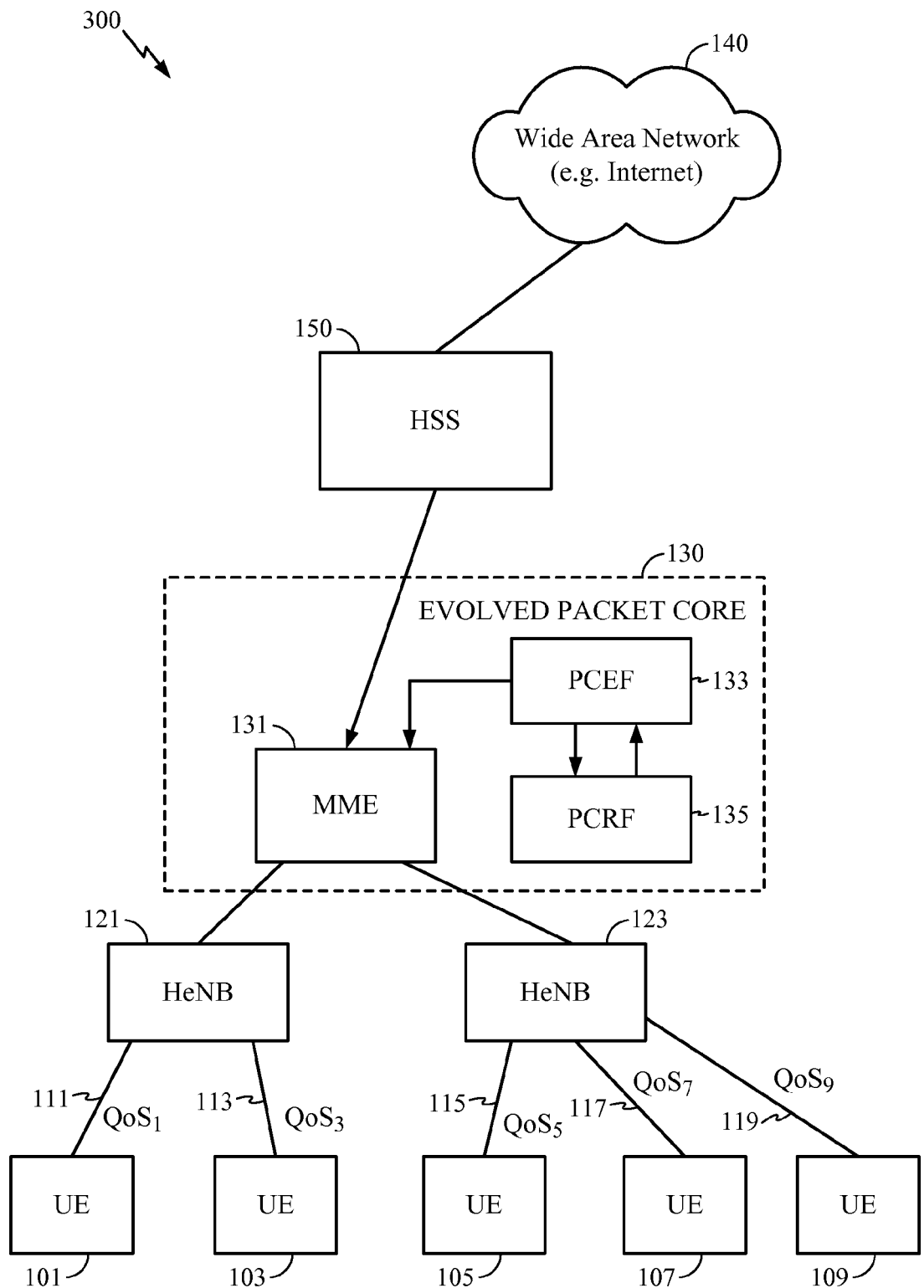
FIG. 3 is a simplified block diagram of several sample aspects of a communication system.

FIG. 3 is a simplified block diagram of several sample aspects of a communication system 300 utilizing long-term evolution (LTE) or other similar technology. The system 300 includes a home subscriber server (HSS) 150, an evolved packet core 130, first and second femto nodes (HeNB) 121 and 123, and five units of user equipment (UE) 101, 103, 105, 107, 109.

Those skilled in the art will also appreciate that the evolved packet core of an LTE system is more complex than the simplified evolved packet core 130 illustrated in FIG. 3. The evolved packet core 130 only contains those components useful for describing some prominent features of some embodiments within the scope of the claims. Accordingly, as illustrated in FIG. 3, the evolved packet core 130 includes a mobility management entity (MME) 131, a policy and charging enforcement function (PCEF) module 133 and a policy and charging rule function (PCRF) module 135.

The HSS 150 is in communication with a wide area network 120 (e.g. Internet and/or private network). The HSS 150 is also in communication with the MME 131. Within the evolved packet core 130, the MME is in communication with at least the PCEF 133, and the PCRF 135 is in communication with PCEF 133.

While only two femto nodes 122, 123 are shown in FIG. 3, those skilled in the art will appreciate that an LTE system may include any number of femto nodes. Similarly, while only five UEs 101, 103, 105, 107, 109 have been illustrated in FIG. 3, those skilled in the art will appreciate that an LTE system may include any number of access terminals, mobile devices, UEs and the like.

As an illustrative example only, in operation, the UE 101 and the UE 103 establish respective communication links 111 and 113 with the HeNB 121. Similarly, UEs 105, 107, 109 establish respective communication links 115, 117, 119 with the HeNB 123. Each communication link 111, 113, 115, 117, 119 has a respective quality of service (QoS) $QoS_1$, $QoS_2$, $QoS_3$, $QoS_5$, $QoS_7$, $QoS_9$. Generally, the quality of service for a communication link can be defined according to various criteria, including, but not limited to, acceptable bit-error-rate, acceptable symbol-error-rate, acceptable packet-error-rate, data transmission rate, symbol transmission rate, packet transmission rate, guaranteed bit rate, acceptable signal-to-noise, allocation and retention priority (ARP), etc.

Conventionally, the initial QoS parameter values $QoS_1$, $QoS_2$, $QoS_3$, $QoS_5$, $QoS_7$, $QoS_9$ for each UE 101, 103, 105, 107, 109 are set by the network, based on subscription data. In the case of E-UTRAN, the MME 131 sets the values of $QoS_1$, $QoS_2$, $QoS_3$, $QoS_5$, $QoS_7$, $QoS_9$ based on subscription data provided for the HSS 150. In other words, the HSS provides the MME 131 with information about one or more closed subscriber groups (CSG). A UE not associated with any CSG is generally considered a non-member.

The PCEF 133 may change the values of $QoS_1$, $QoS_2$, $QoS_3$, $QoS_5$, $QoS_7$, $QoS_9$ based interactions with the PCRF 135 and or the local configuration of a femto node. In a conventional system the MME 131 cannot modify the values $QoS_1$, $QoS_2$, $QoS_3$, $QoS_5$, $QoS_7$, $QoS_9$. Accordingly, in a conventional system, at a hybrid node that permits access to CSG members and non-members, but provides priority access to CSG members, communication links established by non-members are terminated to make room for CSG members. In some instances this results in underutilization of available capacity.

For example, consider the case where the UE 107 is a CSG member and the UE 109 is a non-member. If the $QoS_7$ for the UE 107 cannot be provided while providing a particular level of service $QoS_9$ to the UE 109, the communication link 119 will be terminated in order to improve the $QoS_7$ for the UE 107. However, in some instances there may be left over capacity that could have been provided to UE 109, but was not under convention schemes for managing wireless network resources.

By contrast, the present disclosure provides systems, methods and devices for selectively adjusting a quality of service QoS of communication between the access point (e.g. HeNB 123) and a UE (e.g. UE 109) based on both a value indicative of system resources and CSG subscription data, such that a member has priority access to system resources over a non-member. The systems, methods and devices described herein allow an access point operating in a hybrid mode to discriminate between CSG members and non-members, without having to terminate communication links in order to provide CSG members with particular QoS levels. In some embodiments, non-members can maintain or establish new communication links with lower QoS levels in order to utilize unused and available capacity, thereby increasing the utilization of system resources available through femto nodes operating in a hybrid mode.

Figure 4:
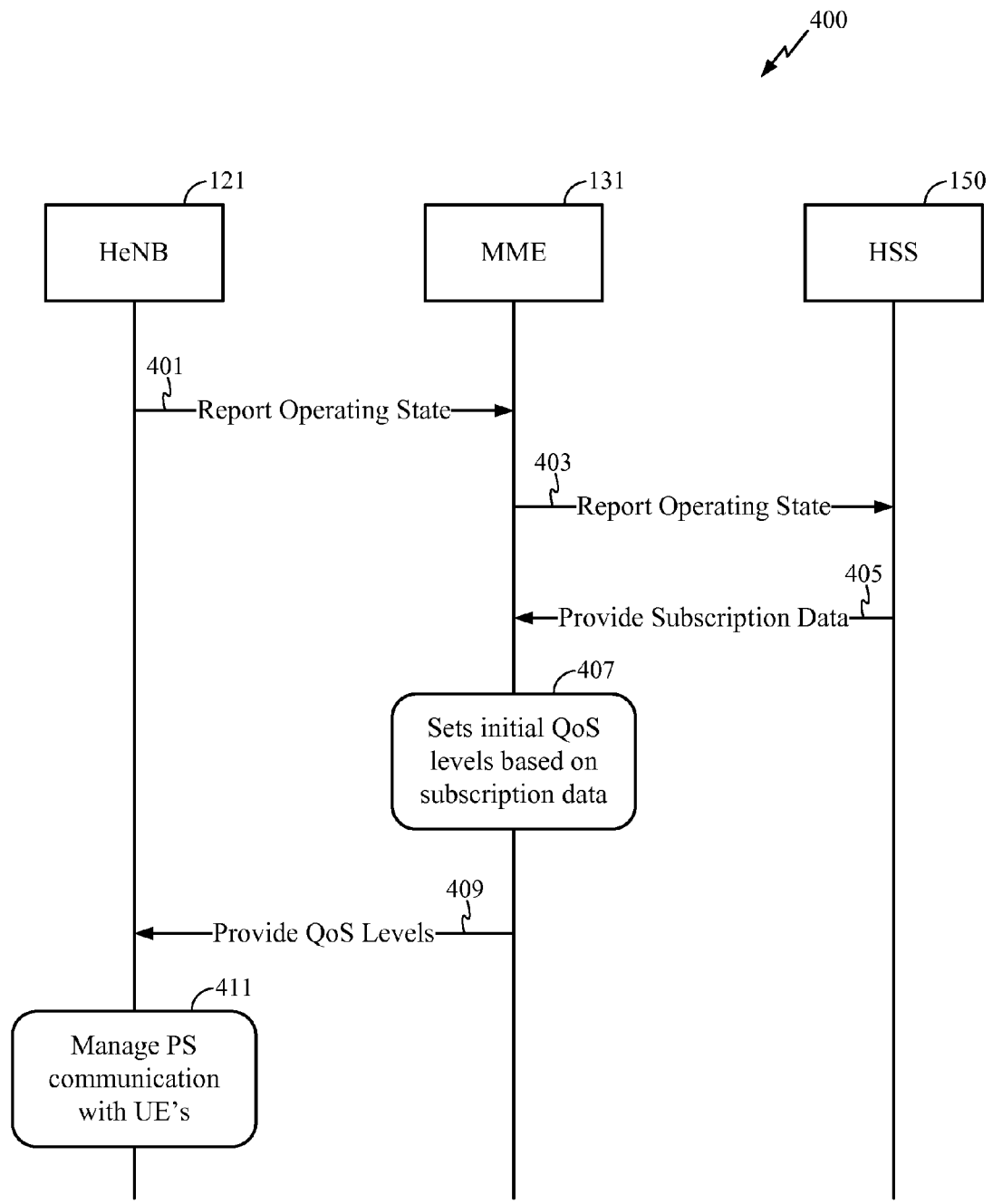
FIG. 4 is a simplified signaling diagram between components of the system illustrated in FIG. 3.

FIG. 4 is a simplified signaling diagram, generally indicated by 400, between components of the system 300 illustrated in FIG. 3. As indicated by 401, the HeNB 121 reports its own operating state to the MME 131. As indicated by 403, the MME 131 relays the same to the HSS 150. Presuming that the HeNB 121 is not operating in an open access mode, the HSS 150 provides subscription data to the MME 131, as indicated by 405. The MME 131 sets the initial QoS levels for various CSG members and non-members, as indicated by 407. Subsequently, the MME 131 provides the QoS levels to the HeNB 121, as indicated by 409. Once the HeNB 121 receives the QoS levels, the HeNB 121 manages packet-switched communication with one or more UEs, as indicated by 411.

Figure 5:
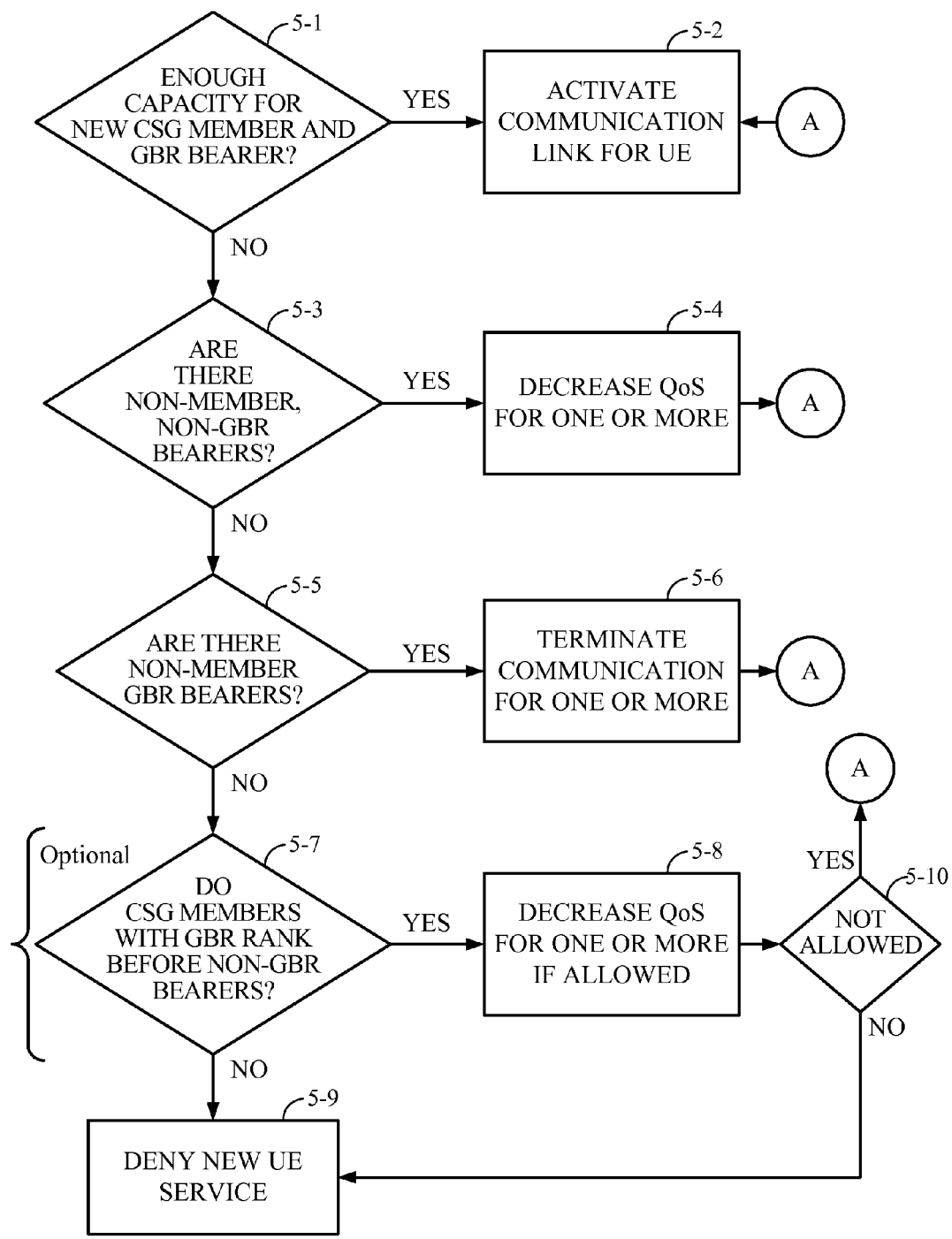
FIG. 5 is a flowchart illustrating a first method to enable management of wireless resources.

FIG. 5 is a flowchart illustrating a first method to enable management of wireless resources at a femto mode (e.g. HeNB 121). The first method is generally applicable to circumstances in which a new CSG member, without a previously established communication link to a femto node, requests access with a guaranteed bit rate (GBR). As represented by block 5-1, the method includes determining whether or not there is enough available capacity to provide a new CSG member with access at a GBR. If there is enough capacity (yes path from 5-1), as represented by 5-2, the method includes activating a communication link with a GBR for the new CSG member.

On the other hand, if there is not enough capacity (no path from 5-1), as represented by 5-3, the method includes determining whether or not non-members with communication links that do not have respective GBRs (i.e. non-members with adjustable QoS levels). If non-members with adjustable QoS levels exist (yes path from 5-3), as represented by 5-4, the method includes decreasing the QoS levels for one or more such non-members; and, again as represented by 5-2, the method includes activating a communication link with a GBR for the new CSG member.

On the other hand, if there are no non-members with adjustable QoS levels (no path from 5-3), as represented by 5-5, the method includes determining whether or not non-members with communication links that have respective GBRs. If such non-members exist (yes path from 5-5), as represented by 5-6, the method includes terminating the communication link of at least one such non-members; and, again as represented by 5-2, the method includes activating a communication link with a GBR for the new CSG member.

On the other hand, if there are no non-members that can be terminated (no path from 5-5), as represented by 5-7, the method includes determining whether or not CSG members with GBR rank ahead of non-GBR CSG members (i.e. CSG members that do not have a respective GBR) with communication links. If such CSG members exist (yes path from 5-7), as represented by 5-8, the method includes decreasing the QoS levels for one or more such CSG members if allowed (as indicated by 5-11); and, again as represented by 5-2, the method includes activating a communication link with a GBR for the new CSG member. If the QoS levels of CSG members cannot be reduced (as represented by 5-7 and 5-11), the method includes denying the new CSG member access, as represented by 5-9.

Figure 6:
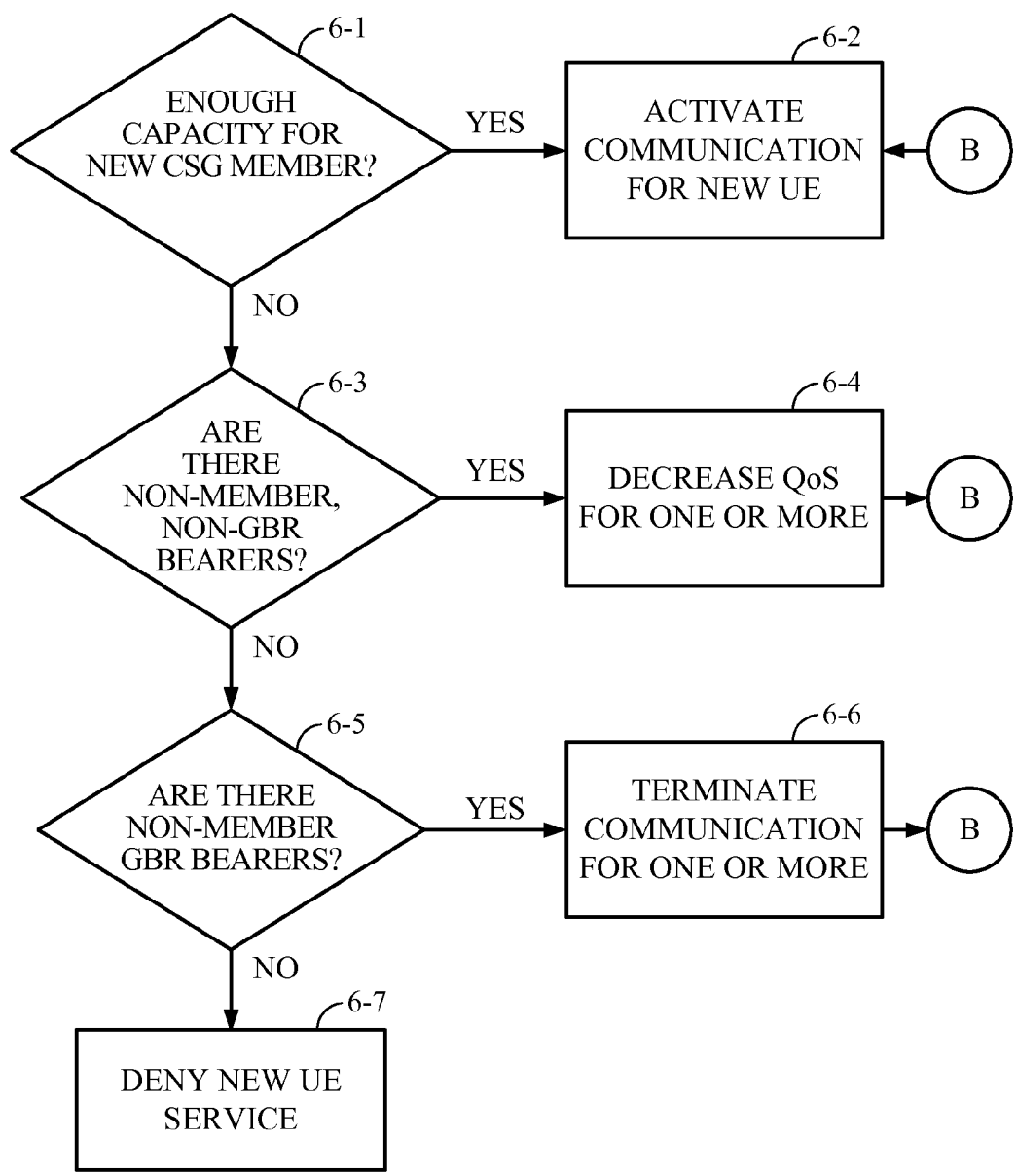
FIG. 6 is a flowchart illustrating a second method to enable management of wireless resources.

FIG. 6 is a flowchart illustrating a second to enable management wireless resources at a femto mode (e.g. HeNB 121). The second method is generally applicable to circumstances in which a new CSG member, without a previously established communication link to a femto node, requests access without a guaranteed bit rate (GBR). As represented by block 6-1, the method includes determining whether or not there is enough available capacity to provide a new CSG member without access at a GBR. If there is enough capacity (yes path from 6-1), as represented by 6-2, the method includes activating a communication link without a GBR for the new CSG member.

On the other hand, if there is not enough capacity (no path from 6-1), as represented by 6-3, the method includes determining whether or not non-members with communication links that do not have respective GBRs (i.e. non-members with adjustable QoS levels). If such non-members exist (yes path from 6-3), as represented by 6-4, the method includes decreasing the QoS levels for one or more such non-members; and, again as represented by 6-2, the method includes activating a communication link without a GBR for the new CSG member.

On the other hand, if there are no non-members with adjustable QoS levels (no path from 6-3), as represented by 6-5, the method includes determining whether or not non-members with communication links that have respective GBRs. If such non-members exist (yes path from 6-5), as represented by 6-6, the method includes terminating the communication link of at least one such non-members; and, again as represented by 6-2, the method includes activating a communication link without a GBR for the new CSG member. On the other hand, if there are no non-members (no path from 6-5), as represented by 6-7, the method includes denying the new CSG member access.

Figure 7:
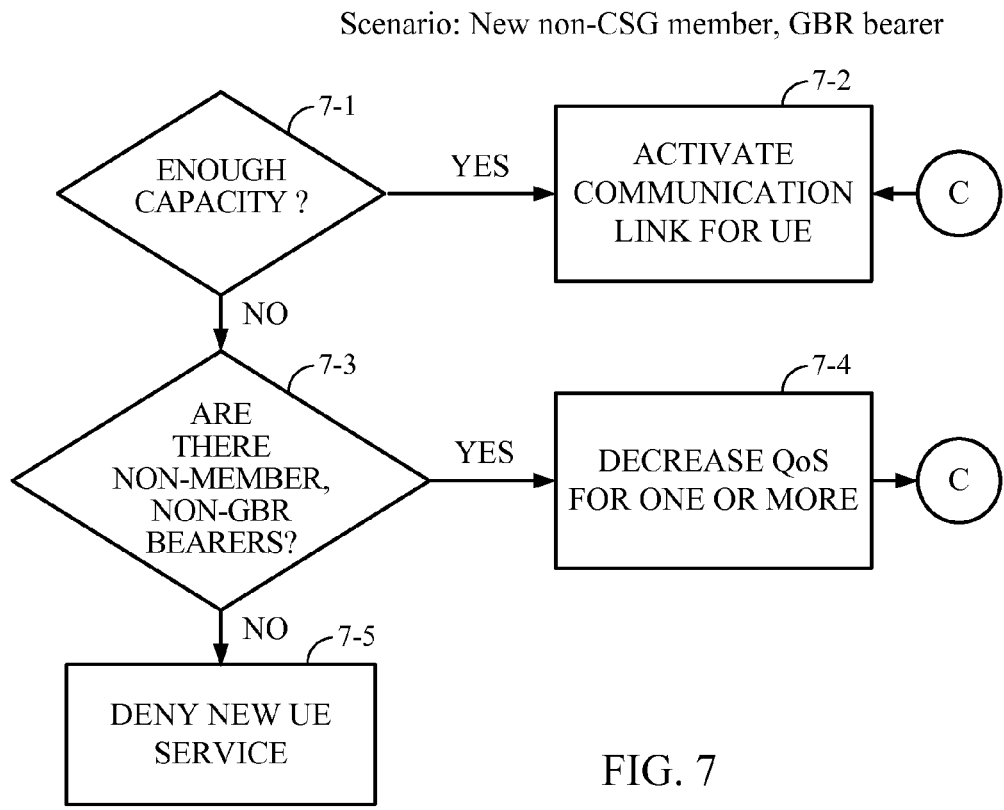
FIG. 7 is a flowchart illustrating a third method to enable management of wireless resources.

FIG. 7 is a flowchart illustrating a third method to enable management of wireless resources at a femto mode (e.g. HeNB 121). The third method is generally applicable to circumstances in which a new non-member, without a previously established communication link to a femto node, requests access with a guaranteed bit rate (GBR). As represented by block 7-1, the method includes determining whether or not there is enough available capacity to provide a new non-member with access at a GBR. If there is enough capacity (yes path from 7-1), as represented by 7-2, the method includes activating a communication link with a GBR for the new CSG member.

On the other hand, if there is not enough capacity (no path from 7-1), as represented by 7-3, the method includes determining whether or not non-members with communication links that do not have respective GBRs (i.e. non-members with adjustable QoS levels). If such non-members exist (yes path from 7-3), as represented by 7-4, the method includes decreasing the QoS levels for one or more such non-members; and, again as represented by 7-2, the method includes activating a communication link with a GBR for the new CSG member. On the other hand, if there are no non-members (no path from 7-3), as represented by 7-5 the method includes denying the new non-member access.

Figure 8:
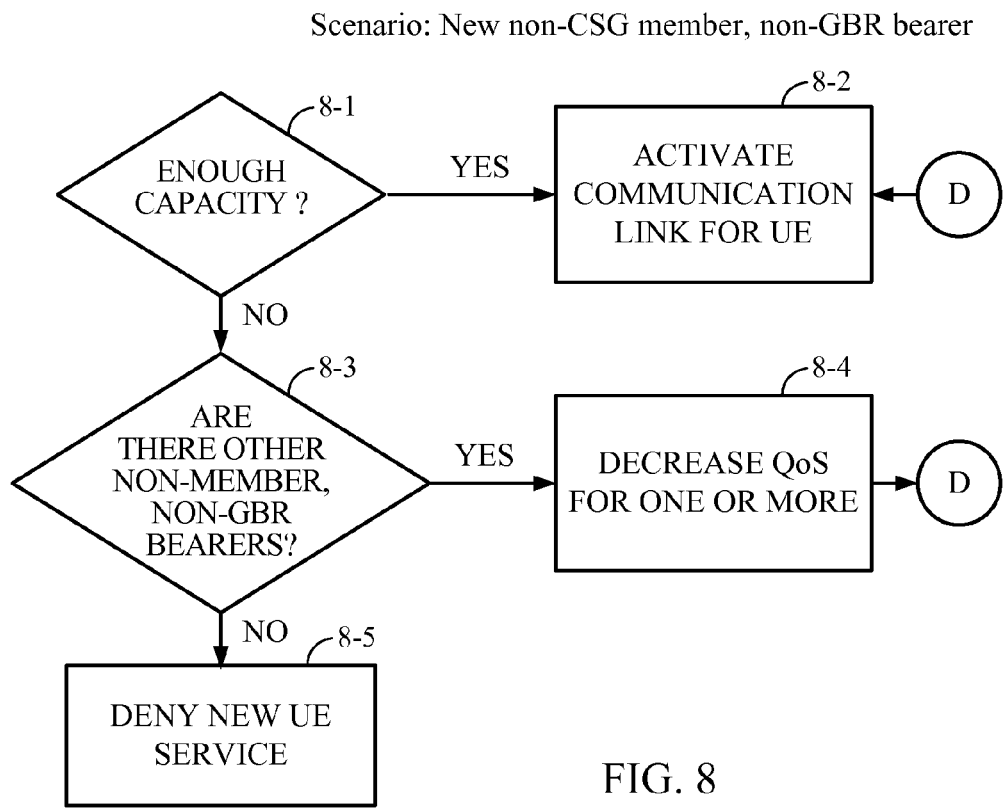
FIG. 8 is a flowchart illustrating a fourth method to enable management of wireless resources.

FIG. 8 is a flowchart illustrating a fourth method to enable management of wireless resources at a femto mode (e.g. HeNB 121). The fourth method is generally applicable to circumstances in which a new non-member, without a previously established communication link to a femto node, requests access without a guaranteed bit rate (GBR). As represented by block 8-1, the method includes determining whether or not there is enough available capacity to provide a new non-member with access at a GBR. If there is enough capacity (yes path from 8-1), as represented by 8-2, the method includes activating a communication link without a GBR for the new CSG member.

On the other hand, if there is not enough capacity (no path from 8-1), as represented by 8-3, the method includes determining whether or not non-members with communication links that do not have respective GBRs (i.e. non-members with adjustable QoS levels). If such non-members exist (yes path from 8-3), as represented by 8-4, the method includes decreasing the QoS levels for one or more such non-members; and, again as represented by 8-2, the method includes activating a communication link without a GBR for the new CSG member. On the other hand, if there are no non-members (no path from 8-3), as represented by 8-5 the method includes denying the new non-member access.

Figure 9:
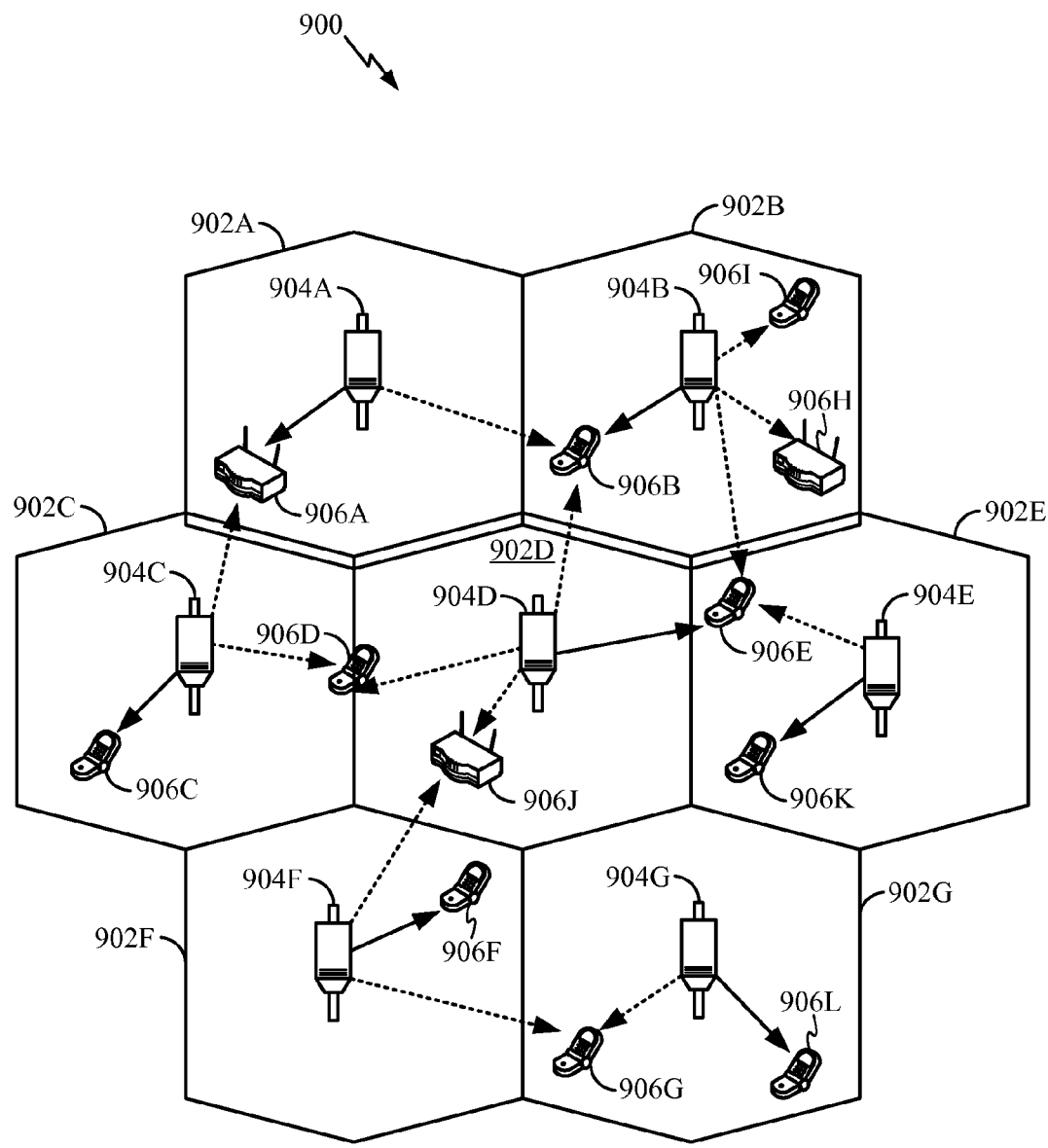
FIG. 9 is a simplified diagram of a wireless communication system.

FIG. 9 is a simplified diagram of a wireless communication system 900, configured to support a number of users, in which the teachings herein may be implemented. The system 900 provides communication for multiple cells 902, such as, for example, macro cells 902A-902G, with each cell being serviced by a corresponding access point 904 (e.g., access points 904A-904G). Access terminals 906 (e.g., access terminals 906A-906L) may be dispersed at various locations throughout the system over time. Each access terminal 906 may communicate with one or more access points 904 on a forward link (FL) and/or a reverse link (RL) at a given moment, depending upon whether the access terminal 906 is active and whether it is in soft handoff, for example. The wireless communication system 900 may provide service over a large geographic region. For example, macro cells 902A-902G may cover a few blocks in a densely populated urban neighborhood or several miles in rural environment.

Figure 10:
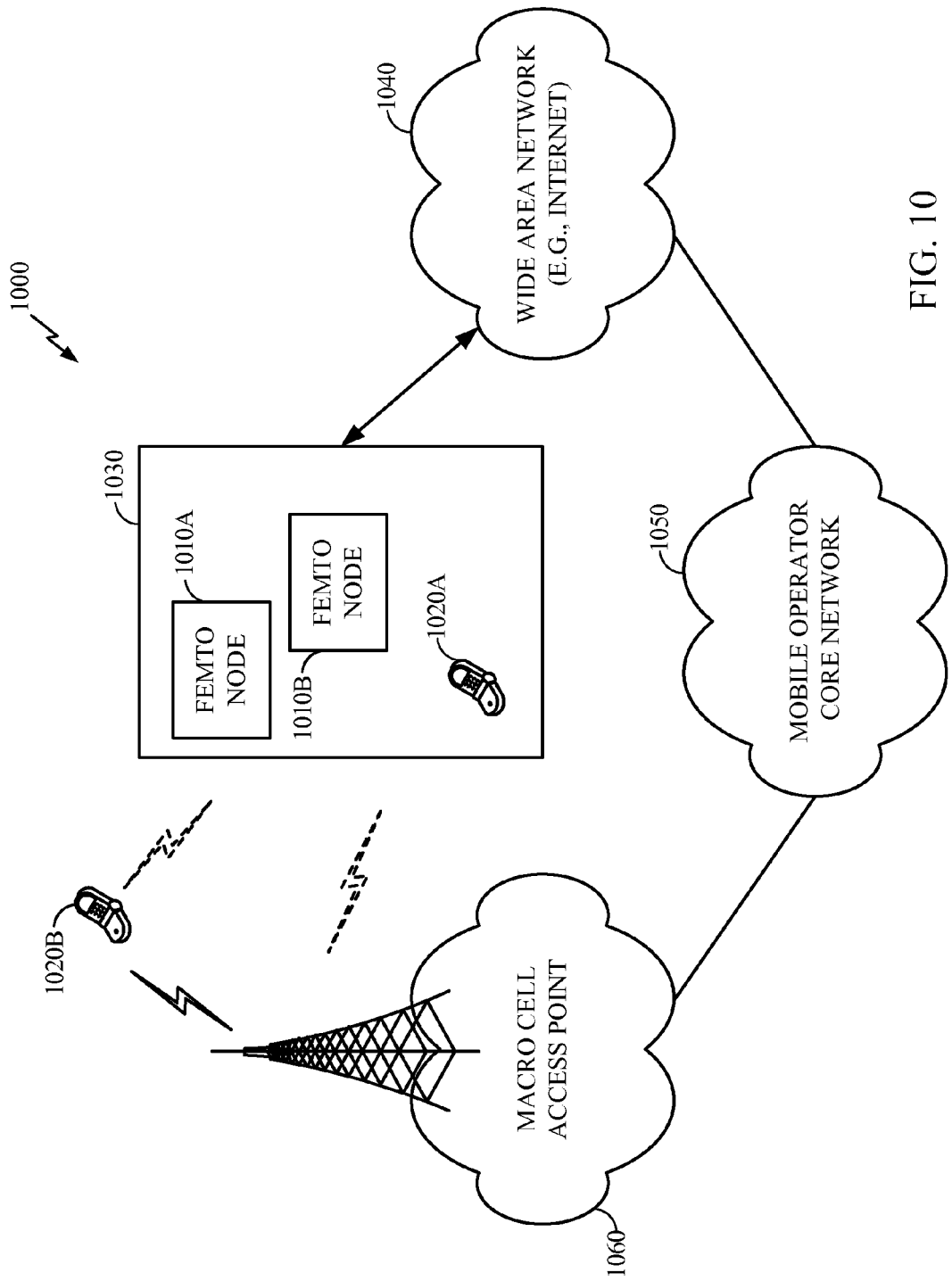
FIG. 10 is a simplified diagram of a wireless communication system including femto nodes.

FIG. 10 is a simplified diagram of an exemplary communication system 1000 where one or more femto nodes are deployed within a network environment. Specifically, the system 1000 includes multiple femto nodes 1010 (e.g., femto nodes 1010A and 1010B) installed in a relatively small scale network environment (e.g., in one or more user residences 1030). Each femto node 1010 may be coupled to a wide area network 1040 (e.g., the Internet) and a mobile operator core network 1050 via a DSL router, a cable modem, a wireless link, or other connectivity means (not shown). As will be discussed below, each femto node 1010 may be configured to serve associated access terminals 1020 (e.g., access terminal 1020A) and, optionally, alien access terminals 1020 (e.g., access terminal 1020B). In other words, access to femto nodes 1010 may be restricted whereby a given access terminal 1020 may be served by a set of designated (e.g., home) femto node(s) 1010 but may not be served by any non-designated femto nodes 1010 (e.g., a neighbor's femto node 1010).

Figure 11:
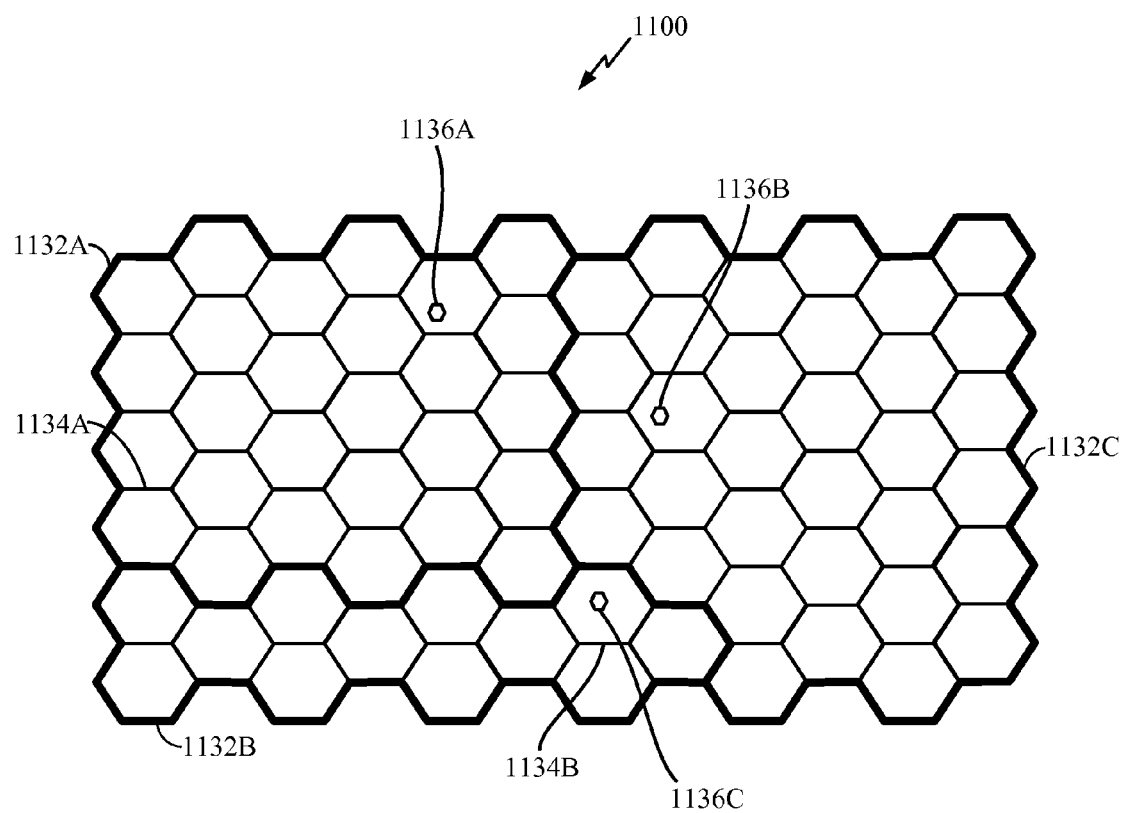
FIG. 11 is a simplified diagram illustrating coverage areas for wireless communication.

FIG. 11 is a simplified diagram illustrating an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the hexagons. The tracking areas 1102 also include femto coverage areas 1106. In this example, each of the femto coverage areas 1106 (e.g., femto coverage area 1106C) is depicted within a macro coverage area 1104 (e.g., macro coverage area 1104B). It should be appreciated, however, that a femto coverage area 1106 may not lie entirely within a macro coverage area 1104. In practice, a large number of femto coverage areas 1106 may be defined with a given tracking area 1102 or macro coverage area 1104. Also, one or more pico coverage areas (not shown) may be defined within a given tracking area 1102 or macro coverage area 1104.

Referring again to FIG. 10, the owner of a femto node 1010 may subscribe to mobile service, such as, for example, 3G mobile service, offered through the mobile operator core network 1050. In addition, an access terminal 1020 may be capable of operating both in macro environments and in smaller scale (e.g., residential) network environments. In other words, depending on the current location of the access terminal 1020, the access terminal 1020 may be served by a macro cell access point 1060 associated with the mobile operator core network 1050 or by any one of a set of femto nodes 1010 (e.g., the femto nodes 1010A and 1010B that reside within a corresponding user residence 1030). For example, when a subscriber is outside his home, he is served by a standard macro access point (e.g., access point 1060) and when the subscriber is at home, he is served by a femto node (e.g., node 1010A). Here, it should be appreciated that a femto node 1010 may be backward compatible with existing access terminals 1020.

A femto node 1010 may be deployed on a single frequency or, in the alternative, on multiple frequencies. Depending on the particular configuration, the single frequency or one or more of the multiple frequencies may overlap with one or more frequencies used by a macro access point (e.g., access point 1060).

In some aspects, an access terminal 1020 may be configured to connect to a preferred femto node (e.g., the home femto node of the access terminal 1020) whenever such connectivity is possible. For example, whenever the access terminal 1020 is within the user's residence 1030, it may be desired that the access terminal 1020 communicate only with the home femto node 1010.

In some aspects, if the access terminal 1020 operates within the macro cellular network 1050 but is not residing on its most preferred network (e.g., as defined in a preferred roaming list), the access terminal 1020 may continue to search for the most preferred network (e.g., the preferred femto node 1010) using a Better System Reselection (BSR), which may involve a periodic scanning of available systems to determine whether better systems are currently available, and subsequent efforts to associate with such preferred systems. With the acquisition entry, the access terminal 1020 may limit the search for specific band and channel. For example, the search for the most preferred system may be repeated periodically. Upon discovery of a preferred femto node 1010, the access terminal 1020 selects the femto node 1010 for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 1010 that reside within the corresponding user residence 1030). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as useful. In some aspects, a closed subscriber group (CSG) may be defined as the set of access points (e.g., femto nodes) that share a common access control list of access terminals. A restricted access point may include a CSG that allows multiple access terminals to connect to it. A single access terminal may have the ability connect to multiple restricted access points. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
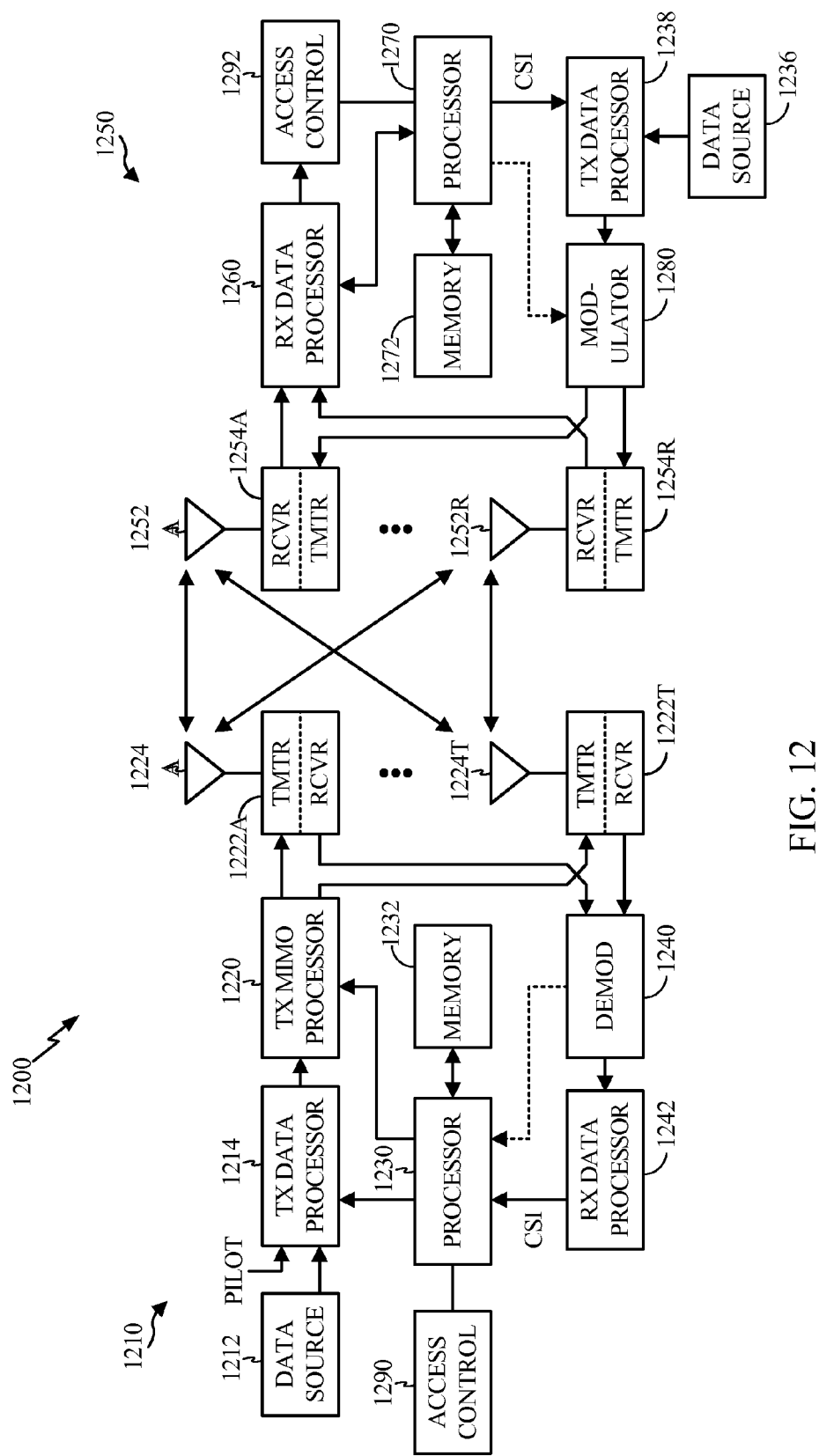
FIG. 12 is a simplified block diagram of several sample aspects of communication components.
Figure 13:
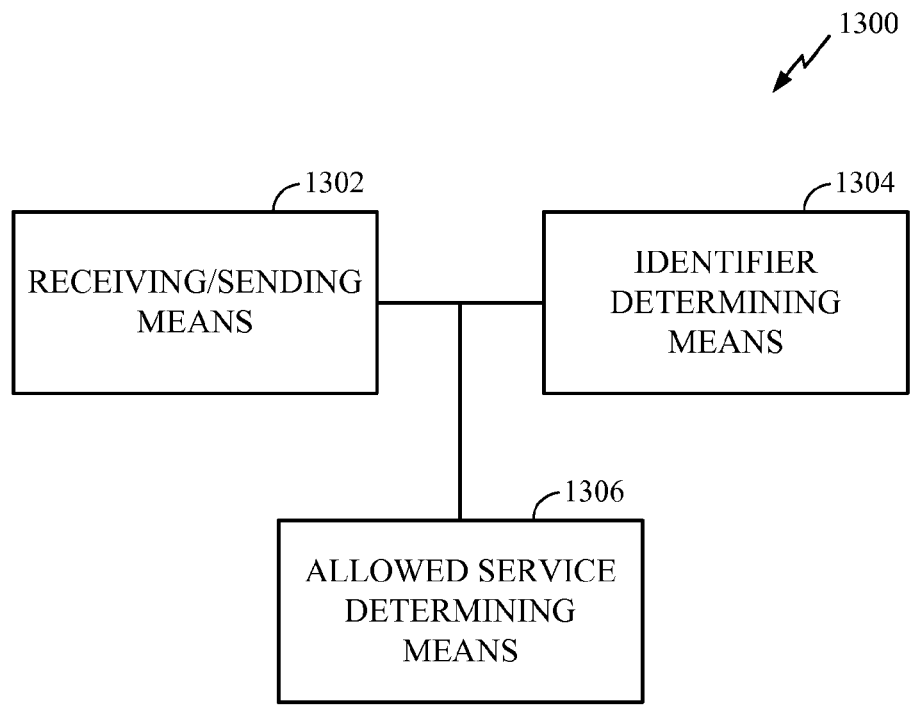
FIGS. 13-23 are simplified block diagrams of several sample aspects of apparatuses configured to provide provisioning and/or access management as taught herein.
Figure 14:
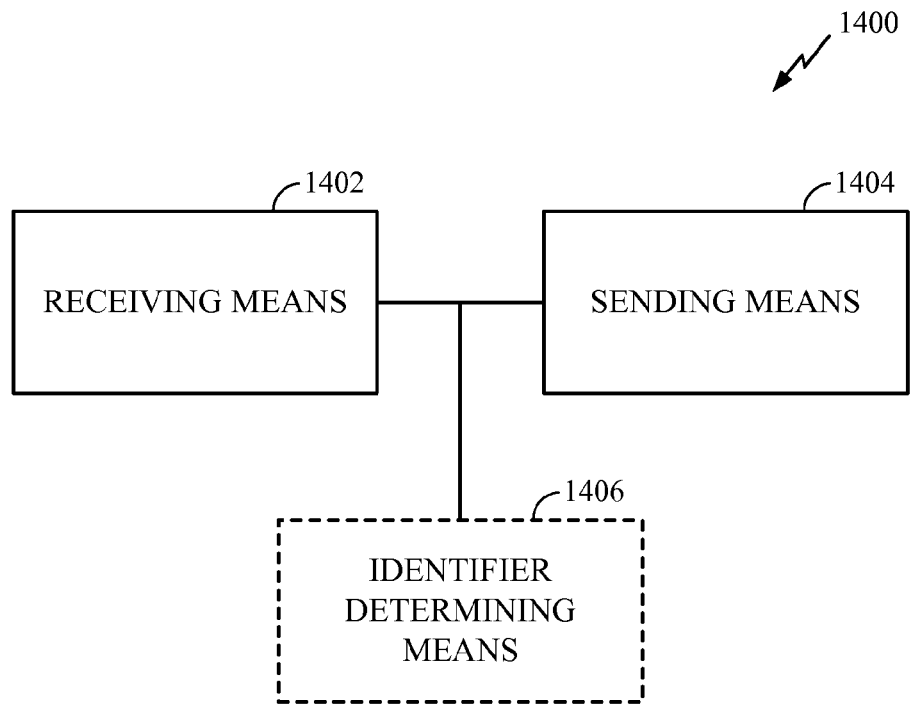
Figure 15:
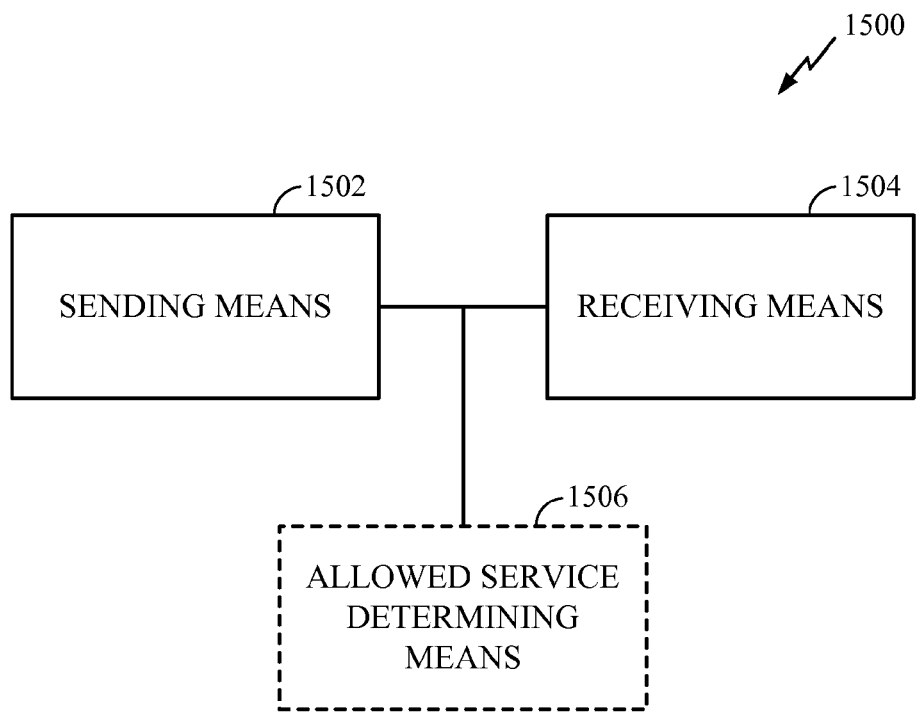
Figure 16:
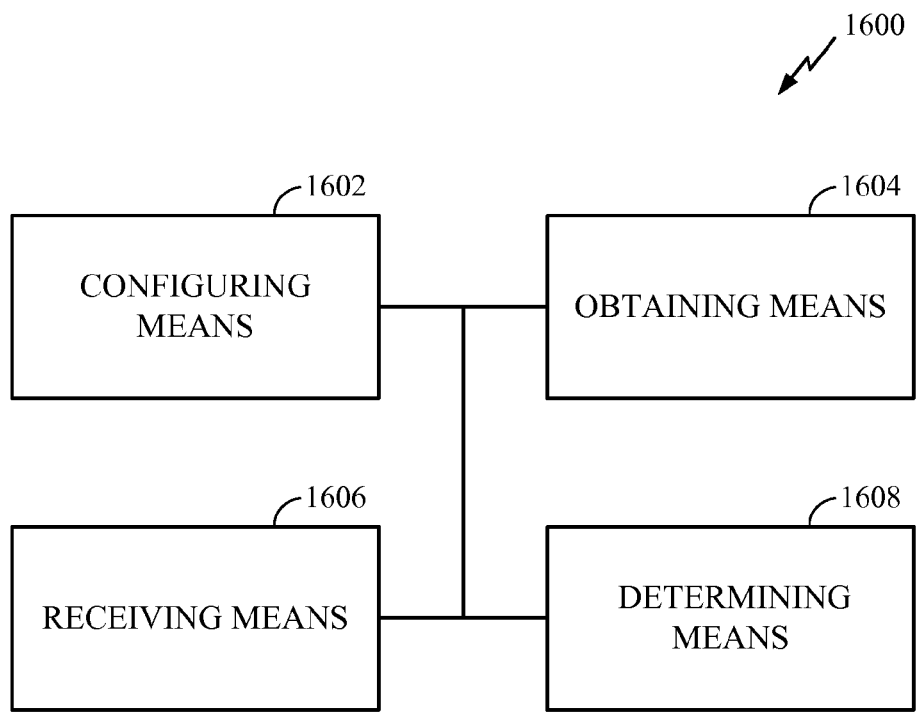
Figure 17:
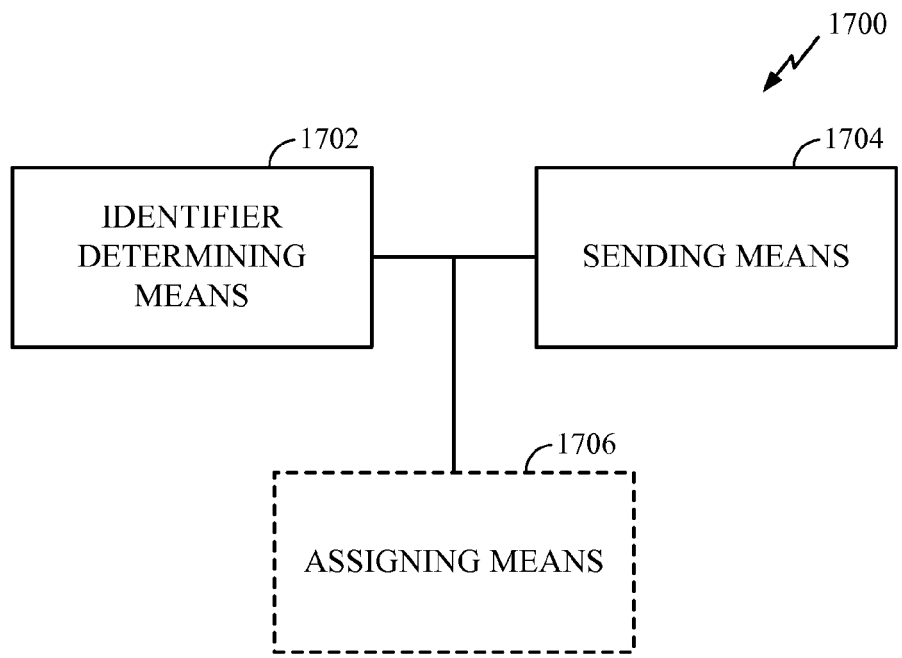
Figure 18:
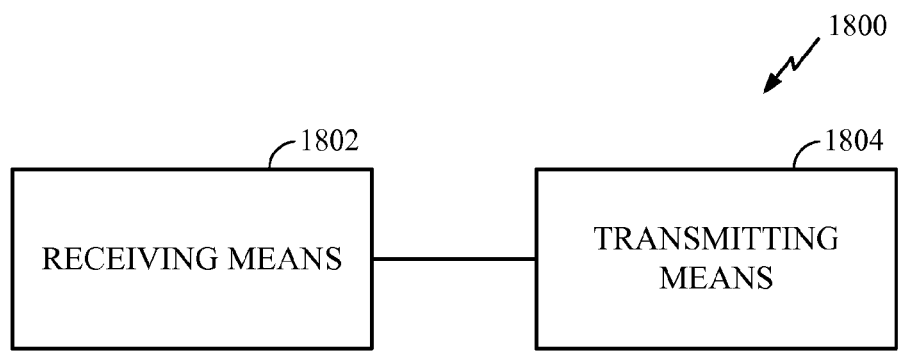
Figure 19:
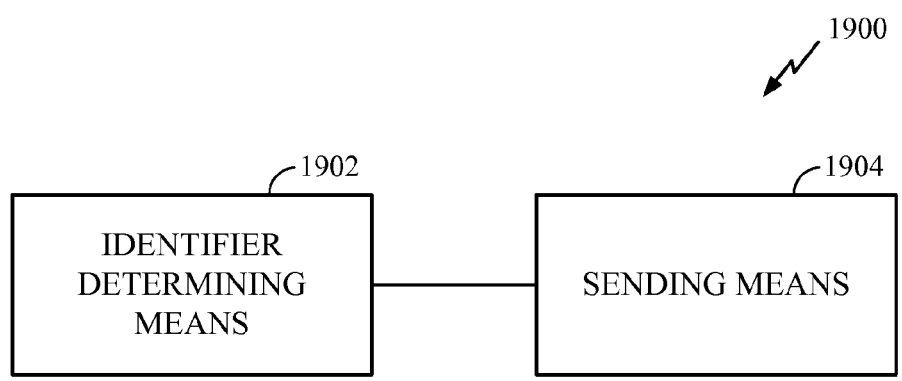
Figure 20:
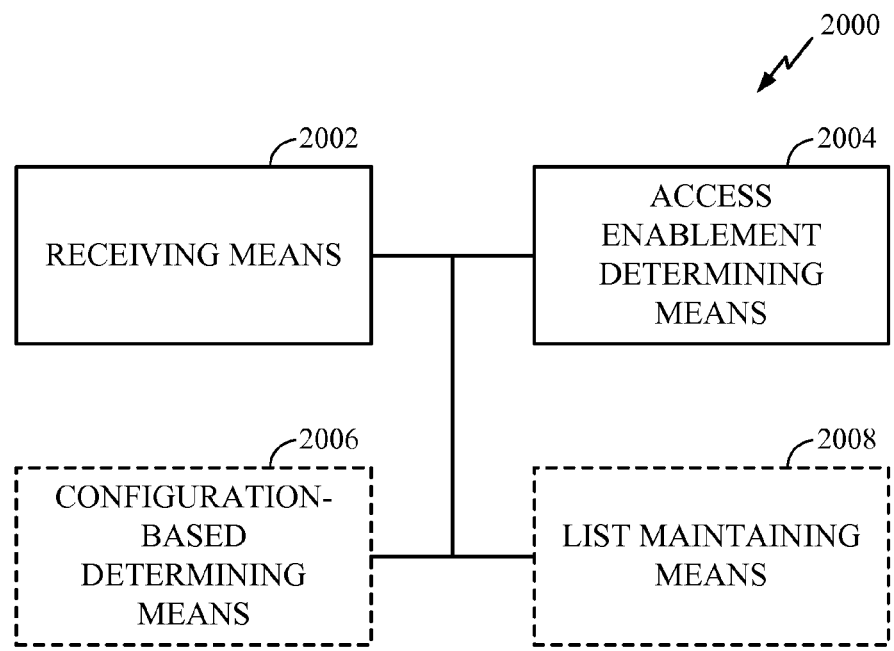
Figure 21:
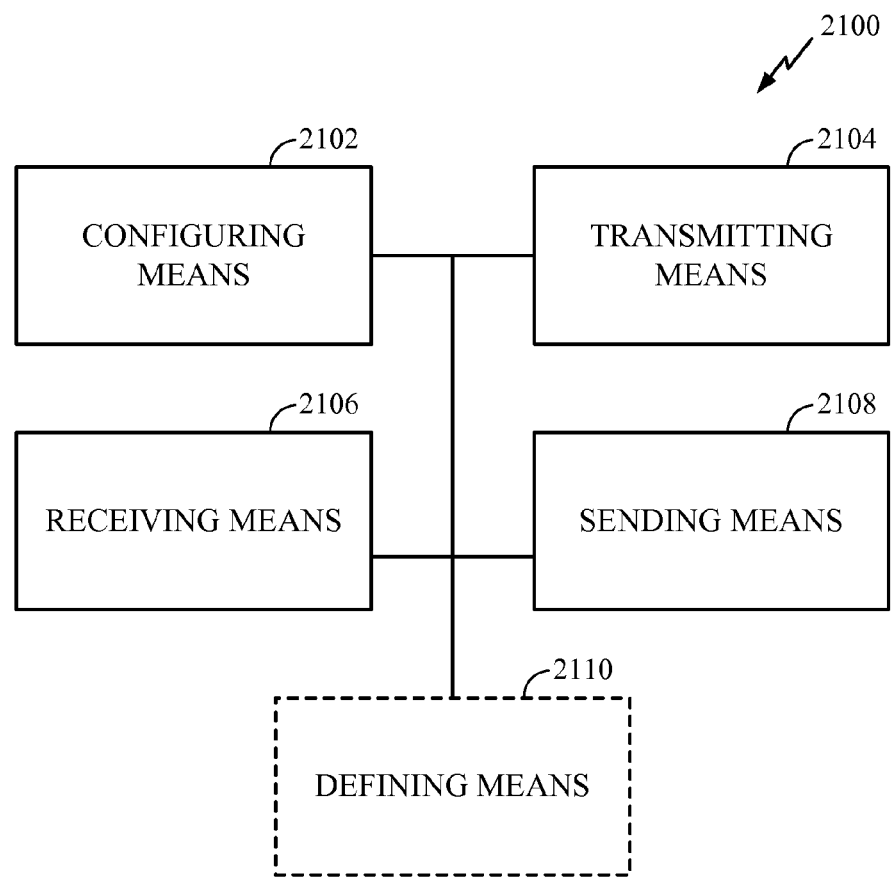
Figure 22:
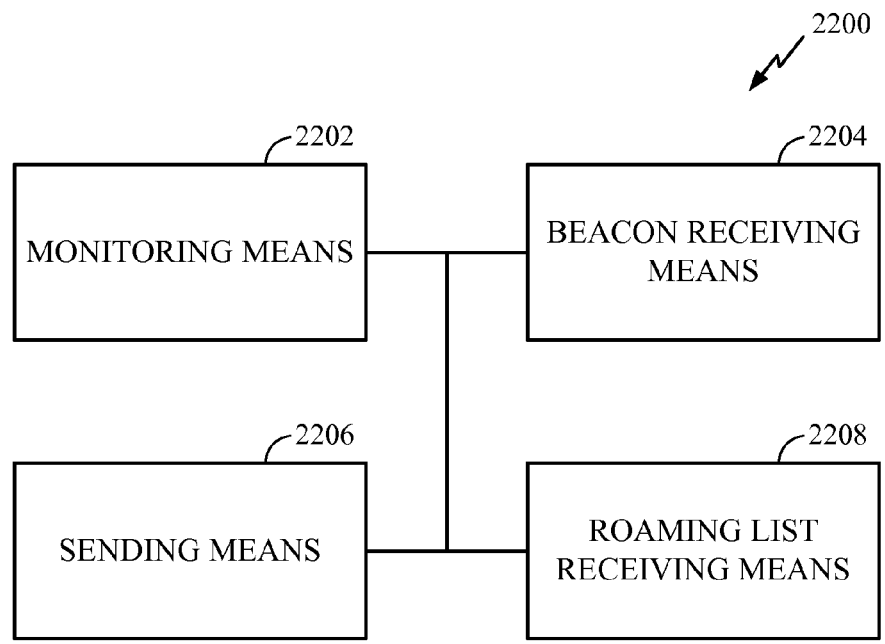
Figure 23:
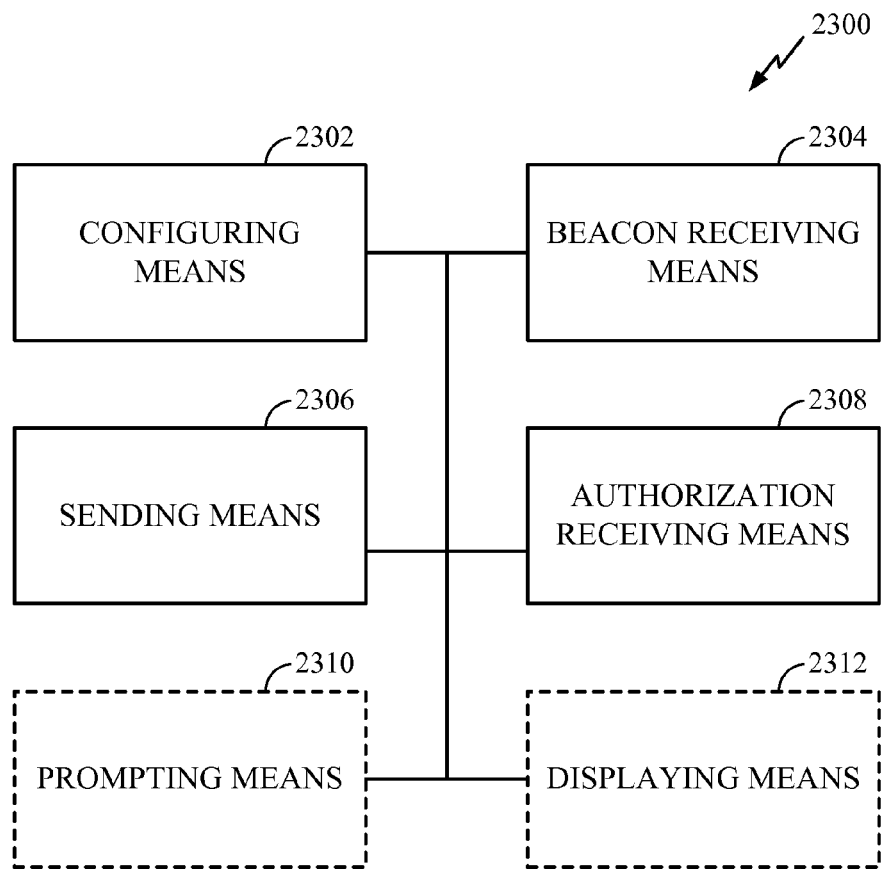

The teachings herein may be incorporated into a node (e.g., a device) employing various components for communicating with at least one other node. FIG. 12 depicts several sample components that may be employed to facilitate communication between nodes. Specifically, FIG. 12 is a simplified block diagram of a first wireless device 1210 (e.g., an access point) and a second wireless device 1250 (e.g., an access terminal) of a MIMO system 1200. At the first device 1210, traffic data for a number of data streams is provided from a data source 1212 to a transmit (TX) data processor 1214.

In some aspects, each data stream is transmitted over a respective transmit antenna. The TX data processor 1214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the second device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the second device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the second device 1250 are received by the antennas 1224, conditioned by the transceivers 1222, demodulated by a demodulator (DEMOD) 1240, and processed by a RX data processor 1242 to extract the reverse link message transmitted by the second device 1250. The processor 1230 then determines which pre-coding matrix to use for determining the beam-forming weights then processes the extracted message.

FIG. 12 also illustrates that the communication components may include one or more components that perform access control operations as taught herein. For example, an access control component 1290 may cooperate with the processor 1230 and/or other components of the device 1210 to send/receive signals to/from another device (e.g., device 1250) as taught herein. Similarly, an access control component 1292 may cooperate with the processor 1270 and/or other components of the device 1250 to send/receive signals to/from another device (e.g., device 1210). It should be appreciated that for each device 1210 and 1250 the functionality of two or more of the described components may be provided by a single component. For example, a single processing component may provide the functionality of the access control component 1290 and the processor 1230 and a single processing component may provide the functionality of the access control component 1292 and the processor 1270.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The components described herein may be implemented in a variety of ways. Referring to FIGS. 13-23, apparatuses 1300, 1400, 1500, 1600, 1700, 1800, 1900, 2000, 2100, 2200, and 2300 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 13-23 are optional.

The apparatuses 1300, 1400, 1500, 1600, 1700, 1800, 1900, 2000, 2100, 2200, and 2300 may include one or more modules that may perform one or more of the functions described above with regard to various figures. For example, a receiving/sending means 1302 may correspond to, for example, a communication controller as discussed herein. An identifier determining means 1304 may correspond to, for example, an access controller as discussed herein. An allowed service determining means 1306 may correspond to, for example, an access controller as discussed herein. A receiving means 1402 may correspond to, for example, a communication controller as discussed herein. A sending means 1404 may correspond to, for example, an access controller as discussed herein. An identifier determining means 1406 may correspond to, for example, an access controller as discussed herein. A sending means 1502 may correspond to, for example, an access controller as discussed herein. A receiving means 1504 may correspond to, for example, a communication controller as discussed herein. An allowed service determining means 1506 may correspond to, for example, an access controller as discussed herein. A configuring means 1602 may correspond to, for example, a provisioning controller as discussed herein. An obtaining means 1604 may correspond to, for example, an access controller as discussed herein. A receiving means 1606 may correspond to, for example, a communication controller as discussed herein. A determining means 1608 may correspond to, for example, an access controller as discussed herein. An identifier determining means 1702 may correspond to, for example, an provisioning controller as discussed herein. A sending means 1704 may correspond to, for example, a communication controller as discussed herein. An assigning means 1706 may correspond to, for example, an provisioning controller as discussed herein. A receiving means 1802 may correspond to, for example, a provisioning controller as discussed herein. A transmitting means 1804 may correspond to, for example, a communication controller as discussed herein. An identifier determining means 1902 may correspond to, for example, a provisioning controller as discussed herein. A sending means 1904 may correspond to, for example, a communication controller as discussed herein. A receiving means 2002 may correspond to, for example, a communication controller as discussed herein. An access enablement determining means 2004 may correspond to, for example, an access controller as discussed herein. A configuration-based determining means 2006 may correspond to, for example, an access controller as discussed herein. A list maintaining means 2008 may correspond to, for example, an access controller as discussed herein. A configuring means 2102 may correspond to, for example, a provisioning controller as discussed herein. A transmitting means 2104 may correspond to, for example, a communication controller as discussed herein. A receiving means 2106 may correspond to, for example, a communication controller as discussed herein. A sending means 2108 may correspond to, for example, a provisioning controller as discussed herein. A defining means 2110 may correspond to, for example, a provisioning controller as discussed herein. A monitoring means 2202 may correspond to, for example, a receiver as discussed herein. A beacon receiving means 2204 may correspond to, for example, a receiver as discussed herein. A sending means 2206 may correspond to, for example, a communication controller as discussed herein. A roaming list receiving means 2208 may correspond to, for example, a provisioning controller as discussed herein. A configuring means 2302 may correspond to, for example, a provisioning controller as discussed herein. A beacon receiving means 2304 may correspond to, for example, a receiver as discussed herein. A sending means 2306 may correspond to, for example, a communication controller as discussed herein. An authorization receiving means 2308 may correspond to, for example, an access controller as discussed herein. A prompting means 2310 may correspond to, for example, an access controller as discussed herein. A displaying means 2312 may correspond to, for example, an access controller as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use embodiments within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of managing communication at a wireless access point, comprising:
   receiving a request from a first access terminal for access to system resources provided from the wireless access point;
   determining whether the first access terminal is a member of a group or a non-member;
   determining a level of service from one of a plurality of levels of service for the first access terminal based on whether the first access terminal is a member or a non-member, wherein the respective levels of service for members and non-members are different;
   determining whether at least one access terminal has an established link to the wireless access point and is a non-member having a respective quality of service (QoS) that can be decreased to accommodate providing access to the first access terminal; and
   selectively adjusting a QoS of communication between the wireless access point and at least one second access terminal comprising the at least one access terminal based on both at least one value indicative of system resources and whether at least one of the first and at least one second access terminals is a member of a group, wherein a member has priority access to system resources over a non-member.

2. The method of claim 1, further comprising receiving a message indicating whether the first access terminal is a member or non-member.

3. The method of claim 2, wherein the message is received from an element in the core-network.

4. The method of claim 1, wherein determining the level of service includes allocating a smaller portion of system resources to the first access terminal than a disparate portion of system resources allocated to one or more other access terminals included in the group.

5. The method of claim 1, further comprising:
   determining the at least one value indicative of system resources provided from the wireless access point.

6. The method of claim 5, wherein the QoS is not adjusted if both the first and at least one second access terminals are members and accommodating the request would disrupt the QoS of communication between the wireless access point and the at least one second access terminal.

7. The method of claim 5, wherein the QoS is not adjusted if the at least one second access terminal is a member and the first access terminal is a non-member.

8. The method of claim 5, wherein the at least one value indicative of system resources comprises data indicating one of: available capacity, utilized capacity, and total capacity.

9. The method of claim 8, wherein determining the available capacity includes determining whether an access terminal without an established link to the wireless access point can be provided with access to system resources without disrupting the QoS provided to access terminals with established links to the wireless access point.

10. The method of claim 9, further comprising:
    determining whether the first access terminal is a group member; and
    denying the first access terminal access to system resources if the first access terminal is a non-member and providing access would disrupt the QoS provided to group members with established links to the wireless access point.

11. The method of claim 10, further comprising providing the first access terminal access to system resources so long as providing access would not disrupt the QoS provided to any access terminals with established links to the wireless access point.

12. The method of claim 10, further comprising:
    providing the first access terminal access to system resources if the first access terminal is a non-member and there is at least one non-member access terminal having a respective QoS that can be decreased to accommodate the first access terminal.

13. The method of claim 10, further comprising providing the first access terminal access to system resources by one of terminating communication between the wireless access point and a non-member with a previously established lower-priority link, and decreasing the QoS for a non-member with a previously established lower-priority link.

14. The method of claim 9, further comprising:
    determining whether the first access terminal is a group member; and
    providing the first access terminal access to system resources if the first access terminal is a member and there is at least one non-member, with a previously established link to the wireless access point, by one of terminating communication between the wireless access point and the non-member and decreasing the QoS for the non-member.

15. The method of claim 14, further comprising providing the first access terminal access to system resources if the first access terminal is a member and there is at least one other member, with a previously established link to the wireless access point, by decreasing the QoS for the other member.

16. The method of claim 14, further comprising:
    determining whether the first access terminal can be provided with access to system resources by adjusting the QoS of communication with non-members; and
    providing the first access terminal access to system resources by decreasing the QoS of at least one non-member.

17. The method of claim 1, wherein some of the access terminals belong to a plurality of different groups, wherein each of the groups has different priority access rights to the system resources as compared to at least one other group.

18. The method of claim 5, wherein the QoS is defined by at least one of acceptable bit-error-rate, acceptable symbol-error-rate, acceptable packet-error-rate, data transmission rate, symbol transmission rate, packet transmission rate, guaranteed bit rate, acceptable signal-to-noise, allocation and retention priority.

19. The method of claim 1, wherein the first access terminal requests a communication link with guaranteed bit rate (GBR) service, wherein differentiation between the respective levels of service provided to members and non-members is implemented with access control by applying allocation and retention priority (ARP).

20. The method of claim 1, wherein the first access terminal requests a communication link with non-guaranteed bit rate (non-GBR) service, wherein differentiation between the respective levels of service provided to members and non-members is implemented by handling packets of the members with higher priority, resulting in higher throughput and lower delay for members as compared to non-members.

21. A wireless access point comprising:
a receiver configured to receive a request from a first access terminal for access to system resources provided from the wireless access point;
a transmitter configured to provide a forward channel between the wireless access point and one or more access terminals, wherein the forward channel comprises at least a portion of the system resources;
a controller configured to execute code; and
non-transitory computer readable memory storing code that when executed by the controller is configured to (i) determine whether the first access terminal is a member of a group or a non-member, (ii) determine a level of service from one of a plurality of levels of service for the first access terminal based on whether the first access terminal is a member or a non-member, wherein the respective levels of service for members and non-members is different, (iii) determine whether at least one access terminal has an established link to the wireless access point and is a non-member having a respective quality of service (QoS) that can be decreased to accommodate providing access to the first access terminal, and (iv) selectively adjust a QoS of communication between the wireless access point and at least one second access terminal comprising the at least one access terminal based on both at least one value indicative of system resources and whether at least one of the first and at least one second access terminals is a member of a group, wherein a member has priority access to system resources over a non-member.

22. The wireless access point of claim 21, wherein the receiver is further configured to enable reverse channel communication between the wireless access point and one or more access terminals, and wherein the reverse channel comprises at least a portion of the system resources.

23. The wireless access point of claim 21, wherein group membership data is provided to the wireless access point from a mobility management entity within a wireless network.

24. The wireless access point of claim 21, wherein determining the level of service includes allocating a smaller portion of system resources to the first access terminal than a disparate portion of system resources allocated to one or more other access terminals included in the group.

25. The wireless access point of claim 21, wherein non-transitory computer readable memory further storing code that when executed by the controller is configured to:
determine the at least one value indicative of system resources provided from the wireless access point.

26. The wireless access point of claim 25, wherein the non-transitory computer readable memory further comprises code that when executed by the controller is configured to determine whether an access terminal without an established link to the wireless access point can be provided with access to system resources without disrupting the QoS provided to access terminals with established links to the wireless access point.

27. The wireless access point of claim 25, wherein the non-transitory computer readable memory further comprises code that when executed by the controller is configured to:
determine whether the first access terminal is a group member; and
deny the first access terminal access to system resources if the first access terminal is a non-member and providing access would disrupt the QoS provided to group members with established links to the wireless access point.

28. The wireless access point of claim 27, wherein the non-transitory computer readable memory further comprises code that when executed by the controller is configured to provide the first access terminal access to system resources so long as providing access would not disrupt the QoS provided to any access terminals with established links to the wireless access point.

29. The wireless access point of claim 27, wherein the non-transitory computer readable memory further comprises code that when executed by the controller is configured to:
provide the first access terminal access to system resources if the first access terminal is a non-member and there is at least one non-member access terminal having a respective QoS that can be decreased to accommodate the first access terminal.

30. The wireless access point of claim 27, wherein the non-transitory computer readable memory further comprises code that when executed by the controller is configured to provide the first access terminal access to system resources by one of terminating communication between the wireless access point and a non-member with a previously established lower-priority link, and decreasing the QoS for a non-member with a previously established lower-priority link.

31. The wireless access point of claim 26, wherein the non-transitory computer readable memory further comprises code that when executed by the controller is configured to provide the first access terminal access to system resources if the first access terminal is a member and there is at least one non-member, with a previously established link to the wireless access point, by one of terminating communication between the wireless access point and the non-member and decreasing the QoS for the non-member.

32. The wireless access point of claim 31, wherein the non-transitory computer readable memory further comprises code that when executed by the controller is configured to provide the first access terminal access to system resources if the first access terminal is a member and there is at least one other member, with a previously established link to the wireless access point, by decreasing the QoS for the other member.

33. The wireless access point of claim 31, wherein the non-transitory computer readable memory further comprises code that when executed by the controller is configured to:
determine whether the first access terminal can be provided with access to system resources by adjusting the QoS of communication with non-members; and
provide the first access terminal access to system resources by decreasing the QoS of at least one non-member.

34. A computer program product comprising a non-transitory machine readable medium having machine executable instructions stored thereon, that when executed by a computing device are configured to:
determine whether a first access terminal is a member of a group or a non-member;
determine a level of service from one of a plurality of levels of service for the first access terminal based on whether the first access terminal is a member or a non-member, wherein the respective levels of service for members and non-members is different;

determine whether at least one access terminal has an established link to the wireless access point and is a non-member having a respective quality of service (QoS) that can be decreased to accommodate providing access to the first access terminal; and selectively adjust a QoS of communication between the wireless access point and at least one second access terminal comprising the at least one access terminal based on both at least one value indicative of system resources and whether at least one of the first and at least one second access terminals is a member of a group, wherein a member has priority access to system resources over a non-member.

35. The computer program product of claim 34, further comprising machine executable instructions stored thereon, that when executed by a computing device are configured to receive a request from a first access terminal for access to system resources provided from an access point.

36. The computer program product of claim 34, further comprising machine executable instructions stored thereon, that when executed by a computing device are configured to determine whether an access terminal without an established link to the wireless access point can be provided with access to system resources without disrupting the QoS provided to access terminals with established links to the wireless access point.

37. The computer program product of claim 36, further comprising machine executable instructions stored thereon, that when executed by a computing device are configured to deny the first access terminal access to system resources if the first access terminal is a non-member and providing access would disrupt the QoS provided to group members with established links to the wireless access point.

38. The computer program product of claim 37, further comprising machine executable instructions stored thereon, that when executed by a computing device are configured to provide the first access terminal access to system resources so long as providing access would not disrupt the QoS provided to any access terminals with established links.

39. The computer program product of claim 38, further comprising machine executable instructions stored thereon, that when executed by a computing device are configured to:
provide the first access terminal access to system resources if the first access terminal is a non-member and there is at least one non-member access terminal having a respective QoS that can be decreased to accommodate the first access terminal.

40. The computer program product of claim 38, further comprising machine executable instructions stored thereon, that when executed by a computing device are configured to provide the first access terminal access to system resources by one of terminating communication between the wireless access point and a non-member with a previously established lower-priority link, and decreasing the QoS for a non-member with a previously established lower-priority link.

41. The computer program product of claim 38, further comprising machine executable instructions stored thereon, that when executed by a computing device are configured to provide the first access terminal access to system resources if the first access terminal is a member and there is at least one non-member, with a previously established link to the wireless access point, by one of terminating communication between the wireless access point and the non-member and decreasing the QoS for the non-member.

42. The computer program product of claim 38, further comprising machine executable instructions stored thereon, that when executed by a computing device are configured to provide the first access terminal access to system resources if the first access terminal is a member and there is at least one other member, with a previously established link to the wireless access point, by decreasing the QoS for the other member.

43. The computer program product of claim 38, further comprising machine executable instructions stored thereon, that when executed by a computing device are configured to:
determine whether the first access terminal can be provided with access to system resources by adjusting the QoS of communication with non-members; and
provide the first access terminal access to system resources by decreasing the QoS of at least one non-member.

44. A wireless access point comprising:
means for receiving a request from a first access terminal for access to system resources provided from the wireless access point;
means for determining at least one value indicative of system resources provided from the wireless access point;
means for determining a level of service from one of a plurality of levels of service to the first access terminal based on whether the first access terminal is a member or a non-member, wherein the respective levels of service for members and non-members is different;
means for determining whether at least one access terminal has an established link to the wireless access point and is a non-member having a respective quality of service (QoS) that can be decreased to accommodate providing access to the first access terminal; and
means for selectively adjust a QoS of communication between the wireless access point and at least one second access terminal based on both the at least one value indicative of system resources and whether at least one of the first and at least one second access terminals is a member of a group, wherein a member has priority access to system resources over a non-member.

45. The wireless access point of claim 44, further comprising means for providing a forward channel between the wireless access point and one or more access terminals, wherein the forward channel comprises at least a portion of the system resources.

46. The wireless access point of claim 44, wherein the means for receiving is further configured to enable reverse channel communication between the wireless access point and one or more access terminals, and wherein the reverse channel comprises at least a portion of the system resources.

* * * * *